미국009016923B2

(12) United States Patent
Kosaka et al.

(10) Patent No.: US 9,016,923 B2
(45) Date of Patent: Apr. 28, 2015

(54) LIGHTING DEVICE, DISPLAY DEVICE, AND TELEVISION RECEIVER

(75) Inventors: Tomohiro Kosaka, Osaka (JP); Toshinori Sugihara, Osaka (JP); Tomofumi Osaki, Osaka (JP); Takehisa Yoshida, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 275 days.

(21) Appl. No.: 13/508,565

(22) PCT Filed: Nov. 9, 2010

(86) PCT No.: PCT/JP2010/069903
§ 371 (c)(1),
(2), (4) Date: May 8, 2012

(87) PCT Pub. No.: WO2011/058960
PCT Pub. Date: May 19, 2011

(65) Prior Publication Data
US 2012/0224106 A1    Sep. 6, 2012

(30) Foreign Application Priority Data

Nov. 10, 2009 (JP) ................................ 2009-257303

(51) Int. Cl.
*F21V 7/04* (2006.01)
*F21V 8/00* (2006.01)
*G02F 1/1335* (2006.01)

(52) U.S. Cl.
CPC .............. *G02B 6/008* (2013.01); *G02B 6/0055* (2013.01); *G02B 6/0061* (2013.01); *G02F 1/133605* (2013.01); *G02F 1/133606* (2013.01); *G02F 1/133611* (2013.01); *G02F 1/133615* (2013.01); *G02F 2001/133601* (2013.01); *G02F 2203/023* (2013.01)

(58) Field of Classification Search
USPC ............... 362/97.1–97.3, 602, 608–610, 612, 362/613, 615, 623, 616
See application file for complete search history.

(56) References Cited

U.S. PATENT DOCUMENTS

| | | | |
|---|---|---|---|
| 2004/0056825 A1 * | 3/2004 | Min et al. .................. | 345/38 |
| 2005/0128374 A1 | 6/2005 | Furukawa | |
| 2007/0290622 A1 | 12/2007 | Furukawa | |

FOREIGN PATENT DOCUMENTS

| | | |
|---|---|---|
| EP | 1 918 768 A2 | 5/2008 |
| JP | 2001-092370 A | 4/2001 |

(Continued)

OTHER PUBLICATIONS

Official Communication issued in International Patent Application No. PCT/JP2010/069903, mailed on Dec. 7, 2010.

*Primary Examiner* — Meghan Dunwiddie
(74) *Attorney, Agent, or Firm* — Keating & Bennett, LLP

(57) ABSTRACT

A lighting device includes light sources arranged at an end, light guide portions arranged along an arrangement direction of the light sources and receiving light from the light sources, and light output portions arranged along a direction crossing the arrangement direction and exiting light from the light guide portions. The light output portions include at least a first light output portion and a second light output portion. The first light output portion is arranged relatively close to the light sources and the second light output portion is arranged relatively farther from the light sources with respect to the first light output portion. The light guide portions include at least a first light guide portion and a second light guide portion, and the first light guide portion is optically connected to the first light output portion and the second light guide portion is optically connected to the second light output portion.

22 Claims, 21 Drawing Sheets

(56) References Cited

FOREIGN PATENT DOCUMENTS

| | | | |
|---|---|---|---|
| JP | 2001-093321 A | 4/2001 |
| JP | 2004-265635 A | 9/2004 |
| JP | 2010-170898 A | 8/2010 |

* cited by examiner

LIGHTING DEVICE, DISPLAY DEVICE, AND TELEVISION RECEIVER

TECHNICAL FIELD

The present invention relates to a lighting device, a display device, and a television receiver.

BACKGROUND ART

In recent years, display elements of image display devices including television receivers are shifting from conventional cathode-ray tube displays to thin display panels such as liquid crystal panels and plasma display panels. With the thin display panels, thin image display devices can be provided. A liquid crystal display device requires a backlight unit as a separate lighting device because a liquid crystal panel used therein is not a light-emitting component. The backlight unit is classified broadly into a direct type and an edge light type according to the mechanism of the backlight unit. To achieve a further reduction in thickness of the liquid crystal display device, it is preferable to use an edge light type backlight unit. Examples thereof disclosed in Patent Documents 1 and 2 mentioned below are known.

Patent Document 1: Japanese Unexamined Patent Publication No. 2001-92370

Patent Document 2: Japanese Unexamined Patent Publication No. 2001-93321

Problem to be Solved by the Invention

The backlight unit disclosed in Patent Document 1 described above includes a plurality of light sources arranged parallel to each other at ends of the backlight unit, and light guide plates that guide light from the light sources to output the light toward the side of a liquid crystal panel. The plurality of light guide plates is formed to extend along a direction orthogonal to the arrangement direction of the light sources and arranged parallel to each other along the arrangement direction of the light sources. In this case, however, though it is possible to control whether or not to exit light between adjacent light guide plates, it is difficult to control whether or not to partially exit light in the direction orthogonal to the arrangement direction of the light sources. This is because the entire area of each light guide plate exits light.

On the other hand, the backlight unit disclosed in Patent Document 2 described above has a configuration in which light sources and light guide plates having the light sources arranged at ends thereof and formed into units, and a plurality of the units is arranged parallel to each other. According to this configuration, devising the arrangement of the units allows fine control as to whether or not to partially exit light on the light exit surface of the entire backlight unit. When the above-described configuration is employed, however, the light sources are arranged not only at ends of the backlight unit but also in the middle portion in a dispersed manner. This may lead to problems of deterioration in workability due to troublesome work for installation of the light sources, and complexity of the wiring configuration of the light sources.

Disclosure of the Present Invention

The present invention has been completed based on the above-described circumstances, and it is an object of the present invention to provide a lighting device configured to control whether or not to partially exit light while arranging light sources at ends in an aggregated manner, and a display device using the lighting device.

Means for Solving the Problem

A lighting device of the present invention includes: a plurality of light sources arranged at ends; a plurality of light guide portions arranged along an arrangement direction of the light sources and configured to receive light from the light sources; and a plurality of light output portions arranged along a direction crossing the arrangement direction of the light sources and configured to exit light from the light guide portions. The plurality of light output portions includes at least a first light output portion and a second light output portion. The first light output portion is arranged relatively close to the light sources and the second light output portion is arranged relatively farther away from the light sources with respect to the first light output portion. The plurality of light guide portions include at least a first light guide portion and a second light guide portion. The first light guide portion is optically connected to the first light output portion and the second light guide portion is optically connected to the second light output portion.

The lighting device is a so-called edge light type in which a plurality of light sources are arranged at ends thereof. This enables reduction in thickness as compared to the direct type. Further, the light sources are arranged at ends of the lighting device in an aggregated manner. Accordingly, as compared to the case where the light sources are arranged not only at the ends but also in the middle portion, the installation of the light sources can be facilitated and the wiring configuration can be simplified. Beside this, according to the present invention, the plurality of light output portions arranged parallel to each other in the direction crossing the arrangement direction of the light sources include at least the first light output portion arranged relatively close to the light sources and the second light output portion arranged relatively farther away from the light sources with respect to the first light output portion. The first light output portion is optically connected to the first light guide portion, and the second light output portion is optically connected to the second light guide portion. Accordingly, for example, it is possible to perform control in which the light sources corresponding to the first light guide portion are turned on and the light sources corresponding to the second light guide portion are turned off to thereby output light from the first light output portion while preventing light from being output from the second light output portion. That is, it is possible to selectively control whether or not to output light from each light output portion by controlling driving of the light sources corresponding to the respective light guide portions.

The following configurations are preferable as embodiments of the present invention.

(1) The light output portions may be arranged to overlap with the light guide portions that are optically connected to the respective light output portions, and the light output portions are overlapped with the respective light guide portions on the light exit side. With this configuration, the length of the light guide portions increases as compared to the case where the light guide portions and the light output portions are arranged parallel to each other along the arrangement direction of the light output portions so as not to overlap with each other. Accordingly, a sufficient optical path length of light propagating through the light guide portions can be secured, and the light can be spread over a wide range of the light output portions. Therefore, unevenness hardly occurs in the light introduced into the light output portions and in the light allowed to exit from the light output portions.

(2) The first light output portion may be arranged to overlap with the second light guide portion on the light exit side, and the second light guide portion may be optically connected to the second light output portion. With this configuration, the second light guide portion optically connected to the second light output portion arranged farther away from the light source with respect to the first light output portion is covered by the first light output portion from the light exit side. This prevents the second light guide portion from being viewed as a dark portion. Further, the shape of the second light guide portion can be simplified as compared to the case where the second light guide portion has a shape bypassing the first light output portion so as not to overlap with the first light output portion.

(3) The plurality of light output portions may be arranged along the direction orthogonal to the arrangement direction of the light sources and each of the light output portions has substantially an equal dimension in the arrangement direction of the light sources. The dimension of each light output portion in the arrangement direction of the light sources substantially coincides with a dimension obtained by adding dimensions of the light guide portions in the arrangement direction that are optically connected to the plurality of light output portions. With this configuration, the plurality of light guide portions arranged parallel to each other along the arrangement direction of the light sources can be covered by the light output portions over the entire area from the light exit side. Further, since the dimensions in the arrangement direction of the light sources in the plurality of light output portions arranged parallel to each other along the direction orthogonal to the arrangement direction of the light sources are substantially the same, the light output portions can be evenly arranged within the plane of the light emitting surface of the lighting device.

(4) At least the first guide portion may include an extending portion extending so as to be far away from the light sources with respect to the first light output portion. With this configuration, the optical path length of light propagating through the first guide portion can be increased by the amount corresponding to the extending-out portion. As a result, unevenness hardly occurs in the light introduced into the first light output portion.

(5) The second light output portion may be arranged to overlap with the extending portion on the light exit side. With this configuration, the extending portion is covered by the second light output portion from the light exit side, thereby preventing the extending portion from being viewed as a dark portion.

(6) Each of the light output portions may include a light exit surface through which light exits, and each of the light output portions may include a light scattering portion on the light exit surface and the light scattering portion scatters light. With this configuration, the light within the light output portions is scattered by the light scattering portion, thereby promoting the light to exit from the light exit surface.

(7) A dimension of each light output portion in the arrangement direction of the light sources may be greater than that of each light guide portion, and a light scattering degree of the light scattering portion may be greater in a portion of the light output portion not overlapping with the light guide portions than in a portion of the light output portion overlapping with the light guide portions. With this configuration, in the light output portions, the amount of light existing in the portion not overlapping with the light guide portions is smaller than that in the portion overlapping with the light guide portions. Meanwhile, in the light scattering portion provided on the light exit surface, the light scattering degree of the portion not overlapping with the light guide portions is greater than that of the portion overlapping with the light guide portions. Accordingly, outgoing of light is suppressed in the portion of the light output portions in which the amount of existing light is large, while outgoing of light is promoted in the portion in which the amount of existing light is small. As a result, unevenness hardly occurs in the distribution of outgoing light within the plane of the light exit surface.

(8) The light scattering degree of the light scattering portion may increase toward the direction away from the light guide portions. With this configuration, the distribution of outgoing light can be made more uniform between the portion not overlapping with the light guide portion and the portion overlapping with the light guide portion in the light output portions.

(9) The light guide portion may include a reflective layer on an end surface that is opposite to an end surface facing the light sources and the reflective layer reflects light. With this configuration, in the light guide portions, the light reaching the end face on the side opposite to the end face facing the light source can be reflected by the reflective layer and directed toward the light output portion. In particular, this configuration is useful when a light source having a high directivity is used.

(10) The light guide portion and the light output portion may be integrally formed. With this configuration, the light can be guided from the light guide portions to the light output portions without being bent, and the use efficiency of light can be improved. Moreover, the number of components can be reduced and the assembling is facilitated.

(11) The light guide portions adjacent to each other in the arrangement direction of the light sources may be optically connected to the light output portions adjacent to each other in the direction crossing the arrangement direction of the light sources. With this configuration, the arrangement of the light guide portions and the light output portions, which are optically connected, can be simplified, thereby facilitating the work for installing the light guide portions and the light output portions.

(12) A light emitting unit may be configured by the plurality of light output portions arranged in the direction crossing the arrangement direction of the light sources, the plurality of light guide portions optically connected to the respective light output portions, and the plurality of light sources supplying light to the respective light guide portions. A plurality of the light-emitting units may be arranged along the arrangement direction of the light sources. With this configuration, the area of the light emitting surface in the lighting device can be increased.

(13) A light emitting unit may be configured by the plurality of light output portions arranged in the direction crossing the arrangement direction of the light sources, the plurality of light guide portions optically connected to the respective light output portions, and the plurality of light sources supplying light to the respective light guide portions. At least a pair of the light-emitting units may be arranged such that a surface of each light-emitting unit farthest away from the light sources faces each other. With this configuration, the area of the light emitting surface in the lighting device can be increased.

(14) The light sources may be LEDs. With this configuration, high brightness, for example, can be achieved.

(15) The LEDs may be mounted on an LED board extending along the arrangement direction of the light guide portions. With this configuration, the arrangement of the LEDs and wiring among the LEDs can be facilitated.

(16) The lighting device may further include a low refractive index layer provided between the adjacent light guide portions and between the adjacent light output portions and the low refractive index layer may have a refractive index lower than that of the light guide portions. With this configuration, when the light within the light guide portions is applied to a boundary surface with the low refractive index layer, the light is reflected almost totally. Accordingly, the light can be effectively propagated to the light output portions. Similarly, when the light within the light output portions is applied to the boundary surface with the low refractive index layer, the light is reflected almost totally. Accordingly, the leakage of light to the side of the adjacent light output portions can be prevented and the mutual optical independence is secured.

(17) The low refractive index layer may be an air space. This configuration eliminates the need for a special member for forming the low refractive index layer, thereby achieving cost reduction.

(18) The lighting device may further include a reflection member provided on a surface of the light guide portions that is opposite to the light exit side and the reflection member may be configured to reflect light. With this configuration, the reflection member reflects the light reaching the surface on the side opposite to the light exit side in the light guide portions, thereby effectively propagating the light to the light output portions.

(19) The reflection member may be provided over the plurality of light guide portions. With this configuration, manufacturing and installation costs can be reduced as compared to the case where the reflection member is divided for each light guide portion.

To solve the above-mentioned problems, a display device according to the present invention may include the lighting device described above and a display panel performing display using light from the lighting device.

According to the display device having the configuration as described above, the lighting device that supplies light to the display panel can control whether or not to partially emit light while arranging the light sources at ends in an aggregated manner, thereby achieving a reduction in manufacturing cost and an improvement in display quality.

A liquid crystal panel may be illustrated as the display panel. This display device is applicable to various applications, such as a television and a display of a personal computer, as a liquid crystal display device. In particular, the display device is suitable for a large screen.

Advantageous Effect of the Invention

According to the present invention, it is possible to provide a lighting device configured to control whether or not to partially emit light while locally arranging light sources at ends, and a display device using the lighting device.

BEST MODE FOR CARRYING OUT THE INVENTION

First Embodiment

Figure 2:
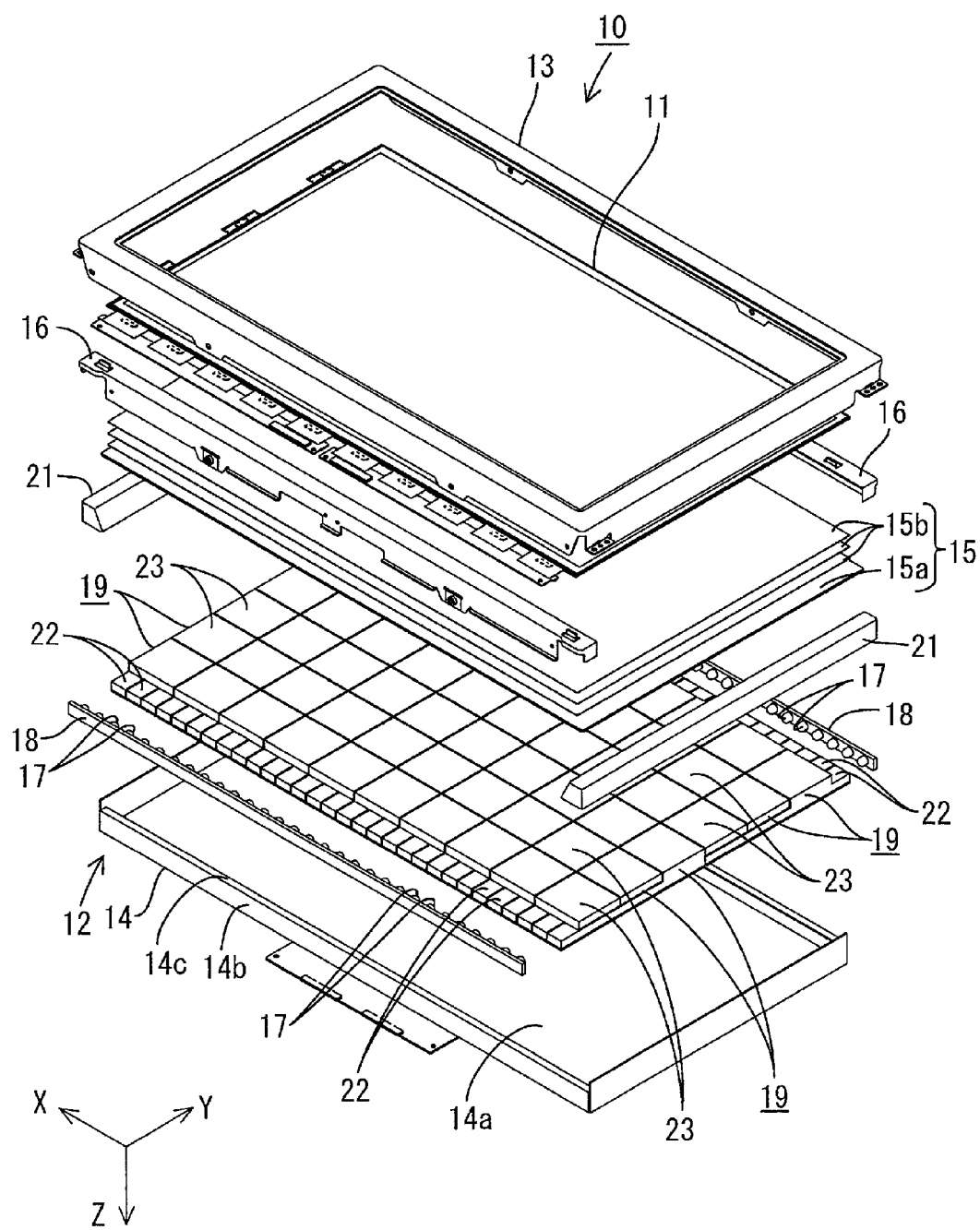
FIG. 2 is an exploded perspective view showing a schematic configuration of a liquid crystal display device included in the television receiver.
Figure 3:
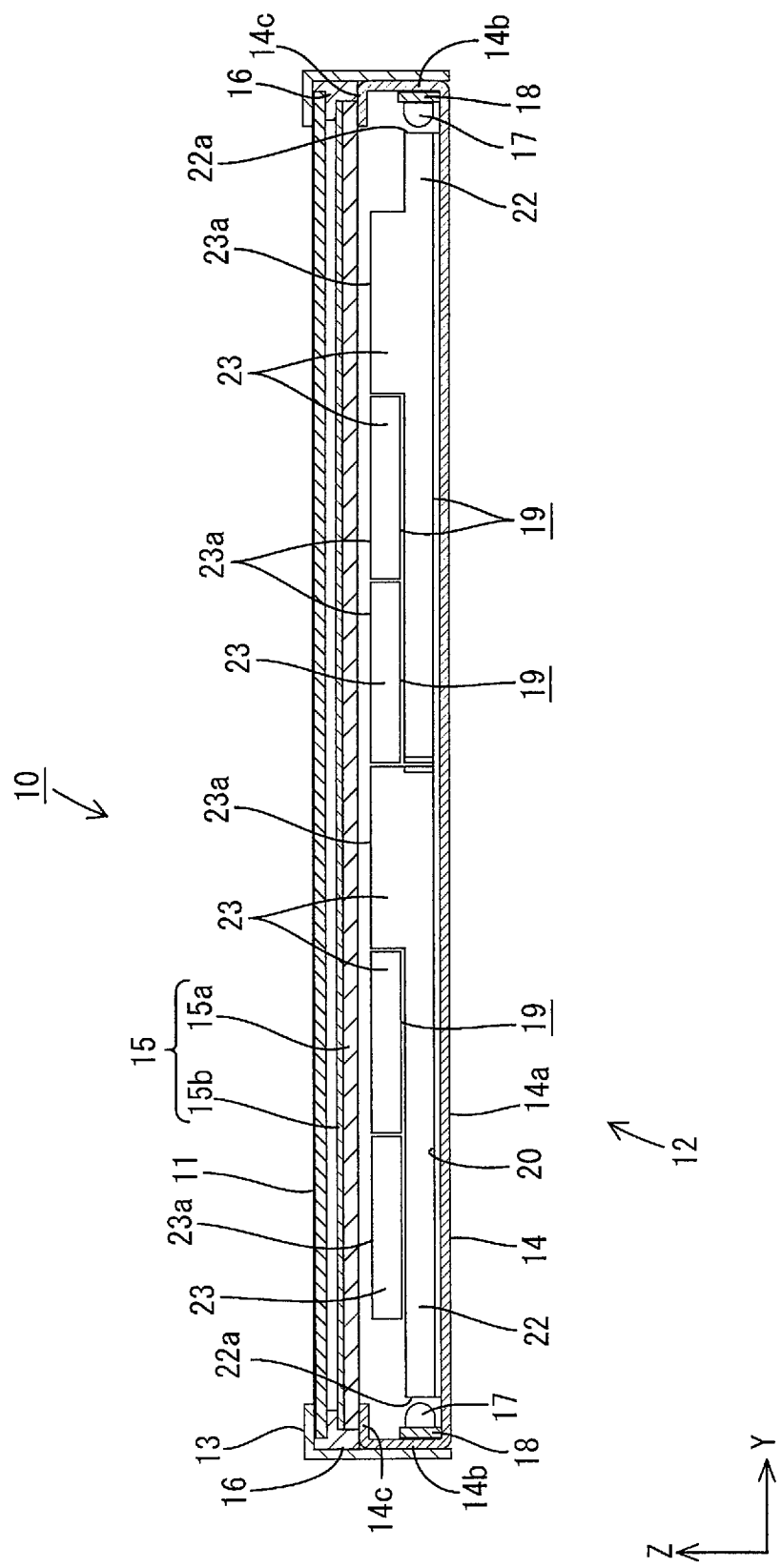
FIG. 3 is a sectional view showing a sectional configuration taken along the short-side direction of the liquid crystal display device.
Figure 4:
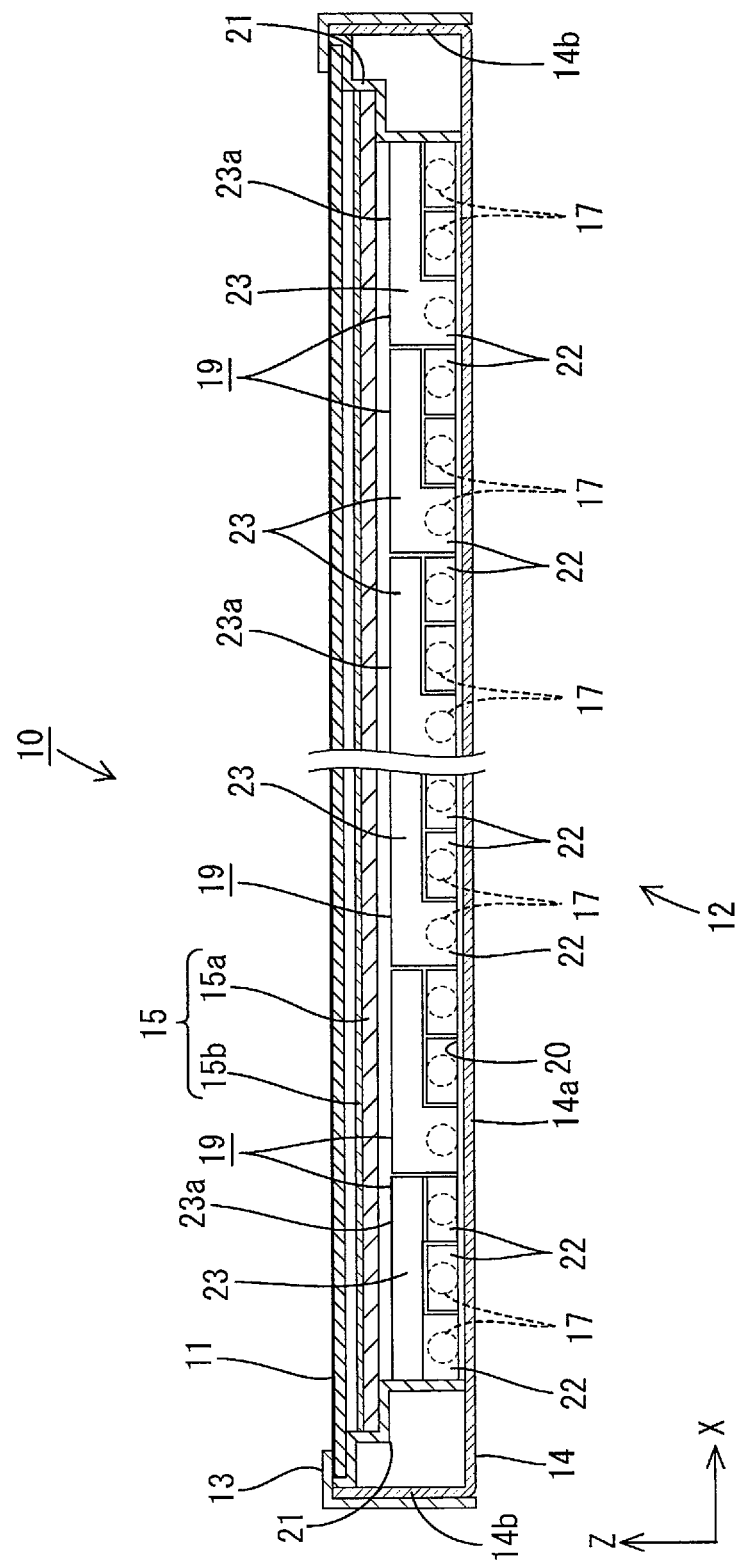
FIG. 4 is an enlarged sectional view showing a sectional configuration taken along the long-side direction of the liquid crystal display device.

A first embodiment of the present invention will be described with reference to FIGS. 1 to 12. In the present embodiment, a liquid crystal display device 10 is illustrated. An X-axis, a Y-axis, and a Z-axis are illustrated in apart of each of the figures, and illustration is made such that the axial directions respectively correspond to the directions illustrated in each figure. The upper side shown in FIGS. 3 and 4 is defined as the front side and the lower side shown in FIGS. 3 and 4 is defined as the rear side.

Figure 1:
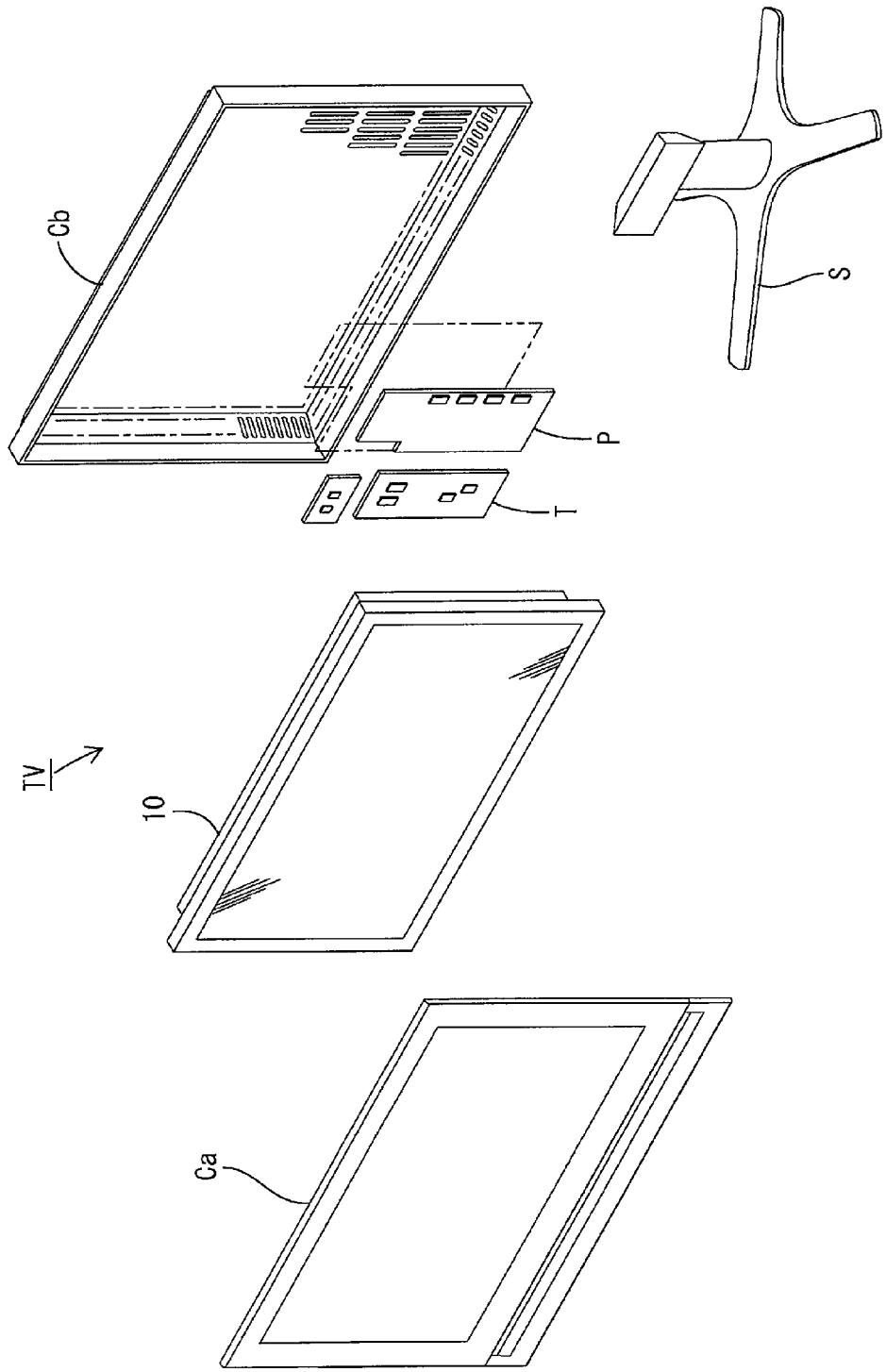
FIG. 1 is an exploded perspective view showing a schematic configuration of a television receiver according to a first embodiment of the present invention.

As shown in FIG. 1, a television receiver TV according to the present embodiment includes the liquid crystal display device 10, front and back cabinets Ca and Cb sandwiching and housing the liquid crystal display device 10; a power source P; a tuner T; and a stand S. The liquid crystal display device (display device) 10 has a horizontally long square shape (rectangular shape) as a whole, and is housed in a vertically placed state. As shown in FIG. 2, the liquid crystal display device 10 includes a liquid crystal panel 11 serving as a display panel, and a backlight unit (lighting device) 12 serving as an external light source. These are integrally held by a frame-like bezel 13 or the like.

As shown in FIG. 2, the liquid crystal panel 11 has a rectangular shape in a plan view, and has a configuration in which a pair of glass substrates is bonded together with a predetermined gap interposed therebetween and a liquid crystal is encapsulated in the gap. One of the glass substrates includes switching components (for example, TFTs) connected to source lines and gate lines which are orthogonal to each other; pixel electrodes connected to the switching components; and an alignment film, for example. The other glass substrates include color filters including color sections for R (red), G (green), B (blue), and the like arranged in a predetermined array; counter electrodes, and an alignment film, for example. Note that a polarizing plate is arranged on the outside of each of the substrates.

As shown in FIG. 2, the backlight unit 12 includes a chassis 14 having a substantially box shape with an opening formed on a light output surface side (side of the liquid crystal panel 11); a group of optical members 15 (a diffuser plate (light diffusing member) 15a and a plurality of optical sheets 15b arranged between the diffuser plate 15a and the liquid crystal panel 11) arranged to cover the opening of the chassis 14; and a frame 16 arranged along an outer edge portion of the chassis 14 and holding an outer edge portion of the group of optical members 15 by sandwiching with the chassis 14. Furthermore, the chassis 14 includes LEDs 17 (Light Emitting Diodes) serving as light sources; LED boards 18 on which the LEDs 17 are mounted; light guide members 19 guiding light from the LEDs 17 to the optical members 15 (liquid crystal panel 11); a reflection sheet 20 arranged on the back side of each light guide member 19; and a pair of holders 21 on which edge portions of the optical member 15 and the liquid crystal panel 11 are placed. The backlight unit 12 includes the LED boards 18 having the LEDs 17 formed at both ends on the long side of the backlight unit 12. The backlight unit 12 is a so-called edge light type (side light type) in which a number of light guide members 19 are arranged on the center side sandwiched between the both LED boards 18. Hereinafter, the components of the backlight unit 12 will be described in detail.

The chassis 14 is made of metal. As shown in FIGS. 3 and 4, the chassis 14 includes a bottom plate 14a having a rectangular shape as with the liquid crystal panel 11; side plates 14b rising from outer edges on each side of the bottom plate 14a; and support plates 14c projecting inward from the pair of side plates 14b on the long side of each of the side plates 14b. As a whole, the chassis 14 forms a shallow, substantially box shape opened to the front side. The long-side direction of the chassis 14 is aligned with the X-axis direction (horizontal direction), and the short-side direction thereof is aligned with the Y-axis direction (vertical direction). The frame 16 and the optical members 15 described later can be placed from the front side on each support plate 14c in the chassis 14. The frame 16 is screwed into each support plate 14c.

As shown in FIG. 2, the optical members 15 each have a rectangular shape in a plan view, like the liquid crystal panel 11 and the chassis 14. As shown in FIG. 3, the outer edge portions of the optical members 15 are placed on the support plate 14c, thereby covering the opening of the chassis 14, and the optical members 15 are interposed between the liquid crystal panel 11 and each light guide member 19. The optical members 15 include the diffuser plate 15a arranged on the back side (the side of the light guide member 19, that is, the side opposite to the light exit side), and the optical sheet 15b arranged on the front side (the side of the liquid crystal panel 11, that is, the light exit side). The diffuser plate 15a has a configuration in which a number of diffusing particles are dispersed within a base substrate made of a substantially transparent resin having a predetermined thickness, and has a function of diffusing transmitted light. The optical sheets 15b each have a sheet shape with a smaller thickness than that of the diffuser plate 15a and are formed by two sheets stacked thereon (FIG. 2). Specific examples of the types of the optical sheets 15b include a diffuser sheet, a lens sheet, and a reflection type polarizing sheet. The optical sheets may be appropriately selected from among these examples to be used.

As shown in FIGS. 2 and 3, the frame 16 is formed to extend along the long-side direction of the chassis 14, and is attached to the front side of each support plate 14c in the chassis 14. The edge portions on the long side of the optical members 15 can be sandwiched between the frame 16 and the support plates 14c. Also, the frame 16 can receive the edge portions on the long side of the liquid crystal panel 11 from the back side.

The holders 21 are made of synthetic resin having white color. As shown in FIGS. 2 and 4, the holders 21 have a long, substantially box shape extending along the short-side direction of the chassis 14, and are attached to the chassis 14 in the state of being arranged along the side plates 14b on the short side of the chassis 14. The holders 21 each have a step-like surface on which the optical members 15 and the liquid crystal panel 11 can be placed at different stages on the front surface side. The holders 21 can receive the optical members 15 and the edge portions on the short side of the liquid crystal panel 11 from the back side.

As shown in FIGS. 2 and 3, the LEDs 17 are configured such that an LED chip is encapsulated with a resin material on a board portion fixed to the LED board 18. The LED chip mounted on the board portion has one type of dominant emission wavelength. Specifically, an LED chip emits a single color light of blue. In the resin material for encapsulating the LED chip, a phosphor for converting blue light emitted from the LED chip into white light is dispersed and blended. This enables the LEDs 17 to emit white light. The LEDs 17 are so-called top-type LEDs. A surface of the LED 17 opposite to the mounting surface mounted to the LED board 18 is a light emitting surface.

As shown in FIGS. 2 and 3, the LED boards 18 have a long plate shape extending along the long-side direction (X-axis direction) of the chassis 14, and are housed in the chassis 14 with a posture in which the main plate surface is parallel to the X-axis direction and the Z-axis direction, that is, a posture in which the main plate surface is orthogonal to the liquid crystal panel 11 and the plate surface of each optical member 15. The pair of LED boards 18 is arranged to correspond to the both ends on the side of the long side within the chassis 14, and are respectively attached to the inner surfaces of the both side plates 14b on the long side. The LEDs 17 having the configuration as described above are mounted on the main plate surface of each of the LED boards 18. The plurality (30 units in FIG. 2) of LEDs 17 is arranged in a row (linearly) along the length direction (X-axis direction) on the main plate surface of each of the LED boards 18. Accordingly, it can be said that the plurality of LEDs 17 is arranged parallel to each other along the long-side direction at both ends on the long side of the backlight unit 12. The pair of LED boards 18 is housed in the chassis 14 with a posture in which the mounting surfaces of the LEDs 17 are facing each other. Thus, the light emitting surfaces of the LEDs 17 mounted on both the LED boards 18 are facing each other, and the light axis in each of the LEDs 17 substantially matches the Y-axis direction.

Further, the base member of each of the LED boards 18 is made of metal, such as an aluminum-based material, as with the chassis 14, and has a configuration in which a wiring pattern (not shown) formed of a metal film, such as copper foil, is formed on the surface of the base member through an insulating layer. This wiring pattern allows the LEDs 17 arranged parallel to each other on the LED boards 18 to be connected in series. Note that an insulating material such as ceramic can also be used as the material for the base member of the LED board 18.

Subsequently, the light guide members 19 will be described in detail. Each light guide member 19 is made of a synthetic resin material (for example, acryl) which has a refractive index sufficiently higher than that of the air and which is substantially transparent (excellent in light transmission property). As shown in FIGS. 2 to 4, a number of light guide members 19 are arranged parallel to each other at positions immediately below the liquid crystal panel 11 and the optical members 15 within the chassis 14, and are arranged to be sandwiched between the pair of LED boards 18 arranged at both ends in the long-side direction in the chassis 14. Accordingly, the direction in which the LEDs 17 (LED boards 18) and the light guide members 19 are arranged coincides with the Y-axis direction, and the direction in which the optical members 15 (liquid crystal panel 11) and the light guide members 19 are arranged coincides with the Z-axis direction. The both arrangement directions are orthogonal to each other. Each light guide member 19 has a function of introducing light emitted from the LEDs 17 in the Y-axis direction and allowing the light to exit upward toward the side of the optical members 15 (Z-axis direction) while propagating the light through the inside. Further, the reflection sheet 20 is arranged between the back side of the light guide members 19, that is, between the bottom plate 14a of the chassis 14 and the light guide members 19. This reflection sheet 20 enables reflection of the light within each light guide member 19 (each light guide portion 22) to the front side. The reflection sheet 20 is laid over substantially the entire area of the bottom plate 14a of the chassis 14, and is arranged to cross all the light guide members 19. In the backlight unit 12 according to the present embodiment, the three types of light guide members 19 having different shapes are used. Hereinafter, the common configuration of the light guide members 19 will be described first, and different configurations of the light guide members 19 will be described later.

First, the common configuration of the light guide members 19 will be described. As shown in FIGS. 2 to 4, each light guide member 19 is formed of the light guide portion 22 that guides light from the LEDs 17 along substantially the Y-axis direction, and a light output portion 23 that is arranged to overlap with the light guide portion 22 on the front side (the side of the optical members 15, that is, the light exit side) and allows the light from the light guide portion 22 to exit toward the front side along substantially the Z-axis direction. The light guide portion 22 and the light output portion 23 are integrally formed. Accordingly, the light guide portion 22 and the light output portion 23 are arranged parallel to each other along the Z-axis direction (light set-up direction), and are optically connected with no interface (joint) therebetween. In other words, the light output portion 23 protrudes from the light guide portion 22 toward the front side. Further, as described above, a number of light guide members 19 are arranged parallel to each other within the chassis 14. Thus, a number of light output portions 23 (light exit surfaces 23a) are planarly arranged in a matrix in each of the X-axis direction and the Y-axis direction. This allows substantially dot-shaped light from the LEDs 17 arranged at both ends in the long-side direction of the chassis 14 to be converted into planar light and to exit toward the optical members 15 and the liquid crystal panel 11.

Each light guide portion 22 has a substantially prism shape extending along the Y-axis direction, and the sectional shape taken along a direction orthogonal to the length direction (axis direction) is a rectangular shape horizontal to the X-axis direction. In each light guide portion 22, an end face having a shape facing the light emitting surface of each LED 17 (mounting surface of each LED board 18) serves as a light entrance surface 22a that receives light from each LED 17. The light entrance surface 22a is formed along each of the X-axis direction and the Z-axis direction and is orthogonal to the plate surfaces of the liquid crystal panel 11 and the optical member 15. The direction (Y-axis direction) in which the LEDs 17 and the light entrance surface 22a are arranged is in parallel with the light exit surface 23a of each light output portion 23 described later. On the other hand, at an end face of each light guide portion 22 on the opposite side from the above-described light entrance surface 22a, a reflective layer 22b that reflects light propagating through each light guide portion 22 is formed. The reflective layer 22b is formed by depositing a metal film having excellent light reflecting properties on the end face of each light guide portion 22. The reflective layer 22b faces each LED 17 through each light guide portion 22. Further, the length dimension (dimension in the Y-axis direction) of the light guide portions 22 is about a half of the short-side dimension of the chassis 14. Further, the width dimension (dimension in the X-axis direction) of each light guide portion 22 is smaller than the light output portions 23 described later, that is, for example, about one third of the light output portion 23.

Figure 6:
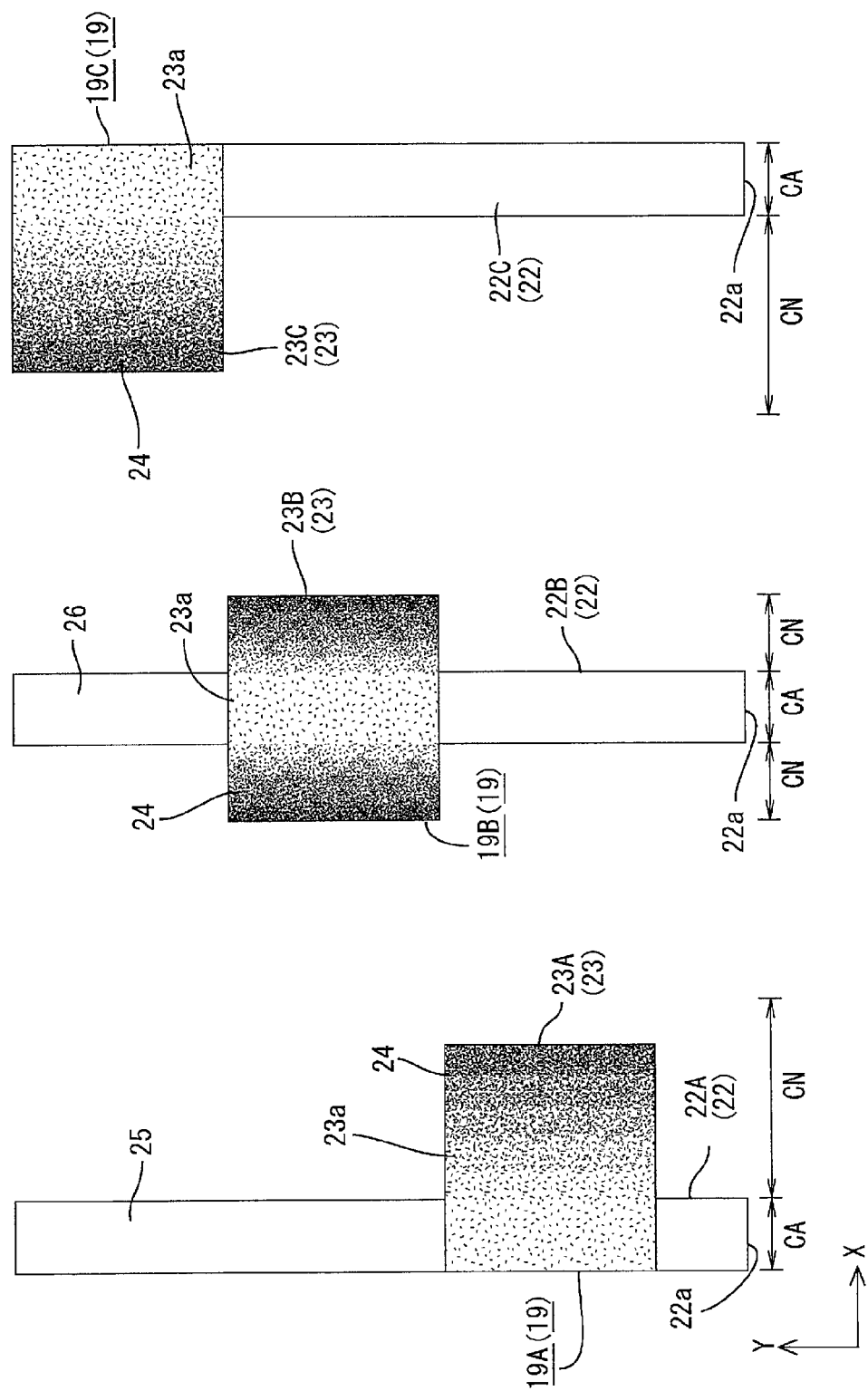
FIG. 6 is a plan view showing a state before assembly of three light guide members constituting a single light-emitting unit.

Each light output portion 23 has a substantially square plate shape in a plan view, and the rear surface thereof is continuous to a predetermined position in the length direction on the front surface of each light guide portion 23. The continuous portion is optically connected without involving the boundary surface. The dimension in the X-axis direction of each light output portion 23 is greater than that of each light guide portion 22, that is, for example, about three times as large as that of each light guide portion 22. Meanwhile, the dimension in the Y-axis direction is smaller than that of each light guide portion 22, that is, for example, about one third or less than that of each light guide portion 22. Accordingly, each light output portion 23 entirely overlaps with each light guide portion 22 in the Y-axis direction in a plan view, and partially (about one third) overlaps with each light guide portion 22 in the X-axis direction. Therefore, each light output portion 23 can be partitioned into a connection portion CA overlapping with each light guide portion 22 in the X-axis direction and is optically connected directly, and a non-connection portion CN not overlapping with each light guide portion 22 and is not directly connected. Among these, the connection portion CA occupies about one third of the entire area of each light output portion 23, and the non-connection portion CN occupies about two thirds of the entire area of each light output portion 23 (FIG. 6). In other words, each light output portion 23 is formed to be outwardly projecting from each light guide portion 22 in the X-axis direction (in the direction orthogonal to the light guide direction of each light guide portion 22). Further, each light guide portion 22 and each light output portion 23 have a substantially equal thickness dimension (dimension in the Z-axis direction) which is substantially equal to the width dimension of each LED board 18.

The front-side surface (surface opposite to a surface on which the light guide portion 22 is provided) of each light output portion 23 serves as a light exit surface 23a and light exits from the entire area thereof. Each light exit surface 23a is formed along the plate surfaces of the liquid crystal panel 11 and each optical member 15 (the X-axis direction and the Y-axis direction), and is orthogonal to each light entrance surface 22a. On each light exit surface 23a, a light scattering portion 24 that allows light to be scattered is formed, thereby promoting outgoing of the light. As the light scattering degree of the light scattering portion 24 increases, outgoing of the light tends to be promoted, and as the light scattering degree decreases, outgoing of the light tends to be suppressed.

Figure 10:
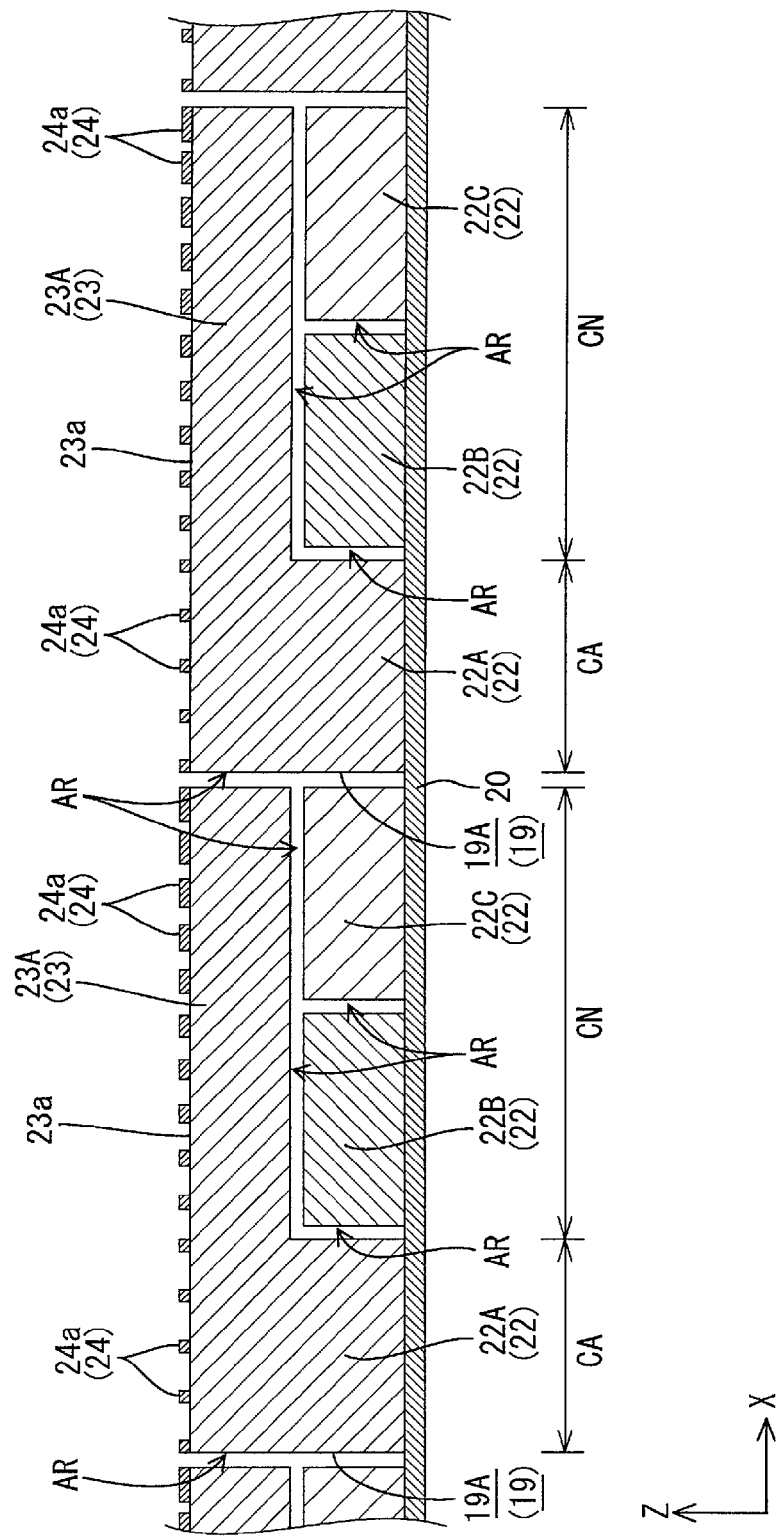
FIG. 10 is a sectional view taken along the line x-x of FIG. 5.
Figure 11:
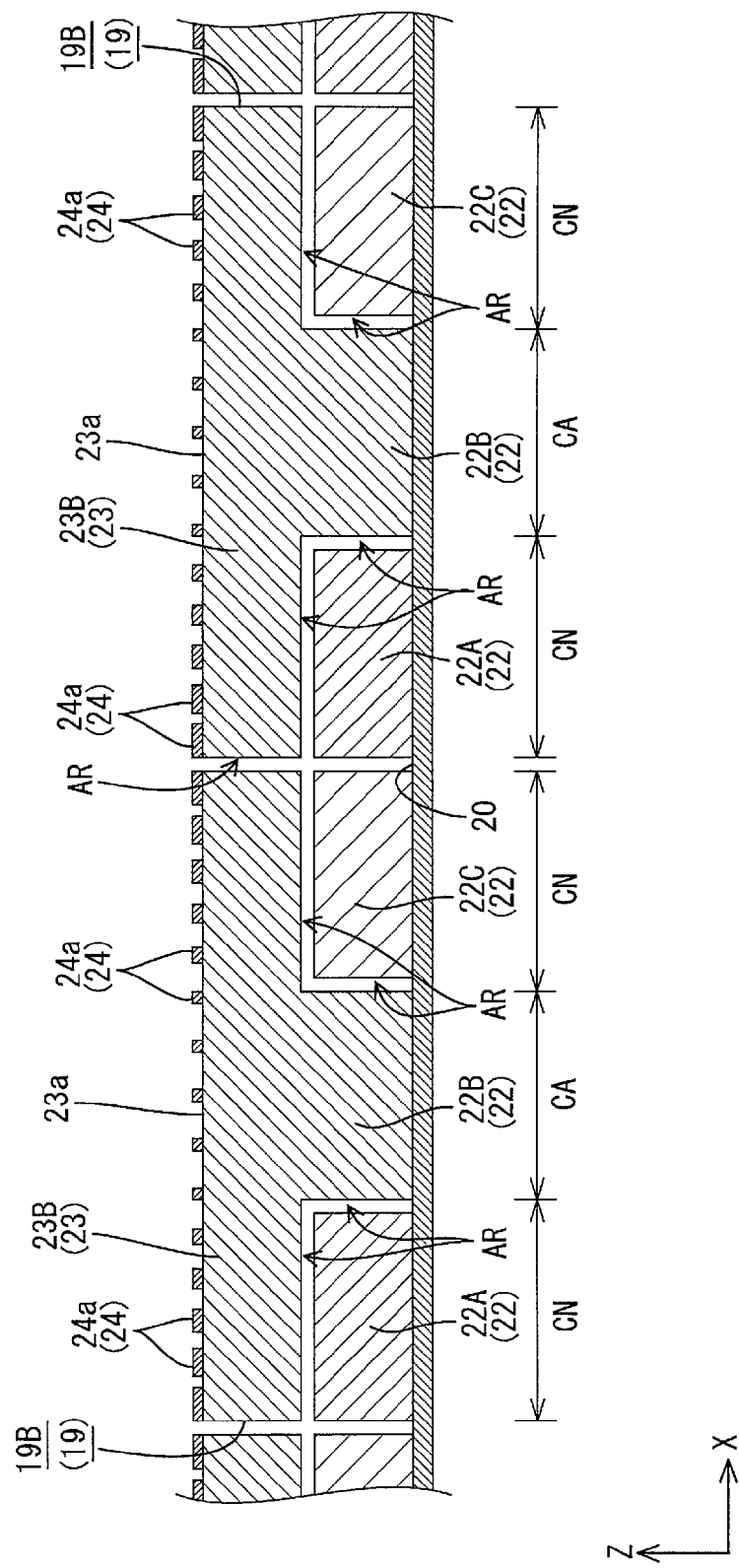
FIG. 11 is a sectional view taken along the line xi-xi of FIG. 5.
Figure 12:
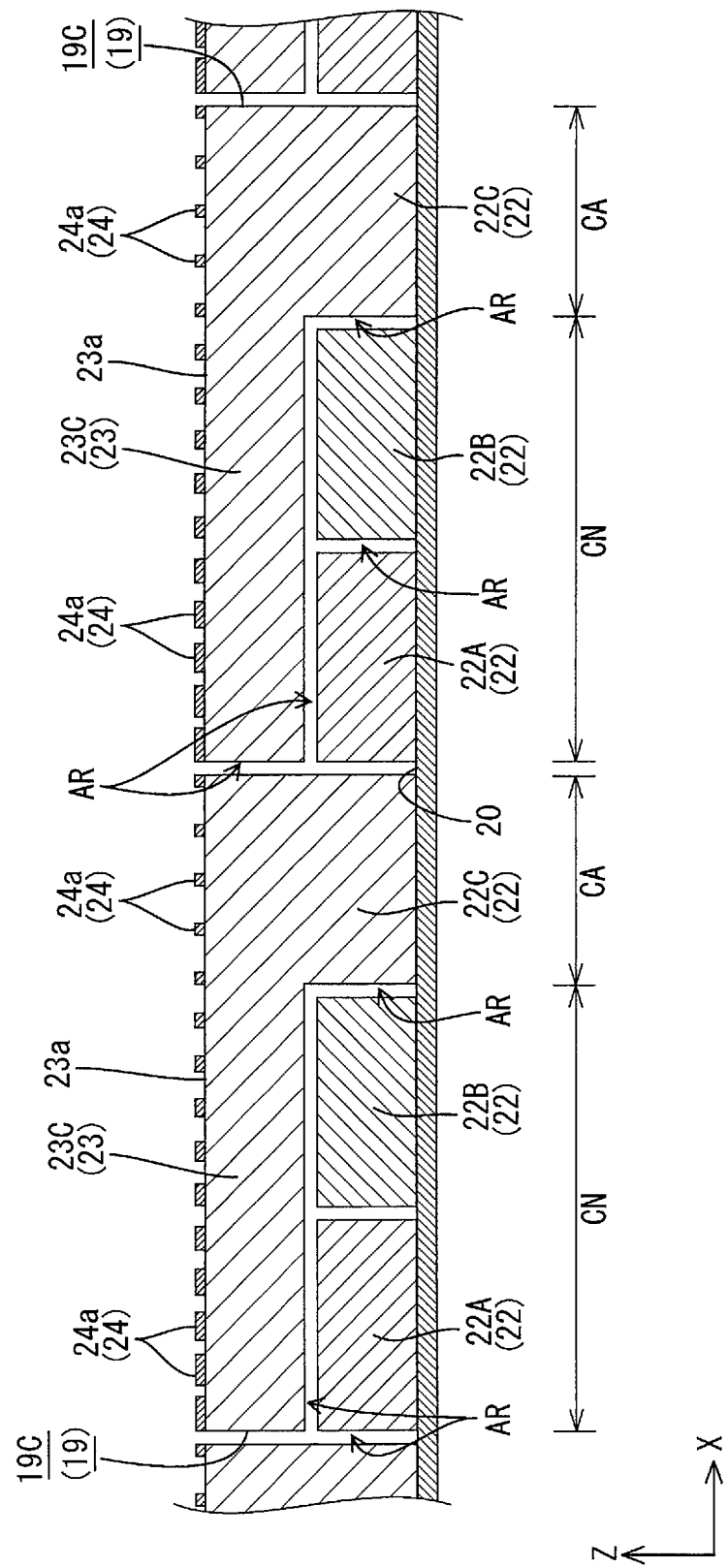
FIG. 12 is a sectional view taken along the line xii-xii of FIG. 5.

Each light scattering portion 24 is formed by printing light scattering particles, such as silica or titanium oxide, on each light exit surface 23a. As shown in FIG. 6, each light scattering portion 24 is formed of a number of dots 24a. The dot pattern is varied within the plane of each light exit surface 23a, thereby making it possible to vary the light scattering degree, that is, the easiness of outgoing (difficulty of outgoing) of light, on each light exit surface 23a. Specifically, the light scattering degree is in proportion to the size of the area of each dot 24a forming each light scattering portion 24. Accordingly, each light scattering portion 24 is patterned such that the area of each dot 4a within the plane of each light exit surface 23a is varied. To be specific, the area of each dot 24a of each light scattering portion 24 is constant in the connection portion CA of each light output portion 23, but is variable in the X-axis direction in the non-connection portion CN. Further, the area decreases toward the connection portion CA and increases as the distance from the connection portion CA (FIGS. 10 to 12). The area of each dot 24a of each light scattering portion 24 is minimum in the connection portion CA of each light output portion 23, and is maximum at an end of the non-connection portion CN on the opposite side from the connection portion CA. Herein, the amount of light existing in each light output portion 23 tends to increase toward each light guide portion 22 serving as a light supply source, and tends to decrease as the distance from the portion away from each light guide portion 22. As described above, by giving a distribution to the light scattering degree of each light exit surface 23a, outgoing of the light is suppressed in the connection portion CA in which the amount of internal light is relatively large. Meanwhile, in the non-connection portion CN, as the amount of internal light decreases, outgoing of the light is promoted. Thus, the distribution of outgoing light within each light exit surface 23a can be made uniform.

Next, different configurations of the light guide members 19 will be described. As shown in FIG. 6, the light guide members 19 have three different shapes, that is, a first light guide member 19A, a second light guide member 19B, and a third light guide member 19C in this order from the left side of the figure. The light guide members 9 are different in configuration in that the connecting position of each light output portion 23 to each light guide portion 22 is different in the X-axis direction and the Y-axis direction. Hereinafter, when the light guide members 19 are distinguished from each other, a suffix A is added to the reference numeral of the first light guide member; a suffix B is added to the reference numeral of the second light guide member; and a suffix C is added to the reference numeral of the third light guide member. When the light guide members 19 are collectively denoted without distinction, no suffix is added to each reference numeral. Additionally, to distinguish the light guide portions 22 and the light output portions 23 constituting each of the light guide members 19, the respective light guide portions 22 are referred to as a first light guide portion 22A to a third light guide portion 22C, and the respective light output portions 23 are referred to as a first light output portion 23A to a third light output portion 23C so as to respectively correspond to the first light guide member 19A to the third light guide member 19C.

Figure 7:
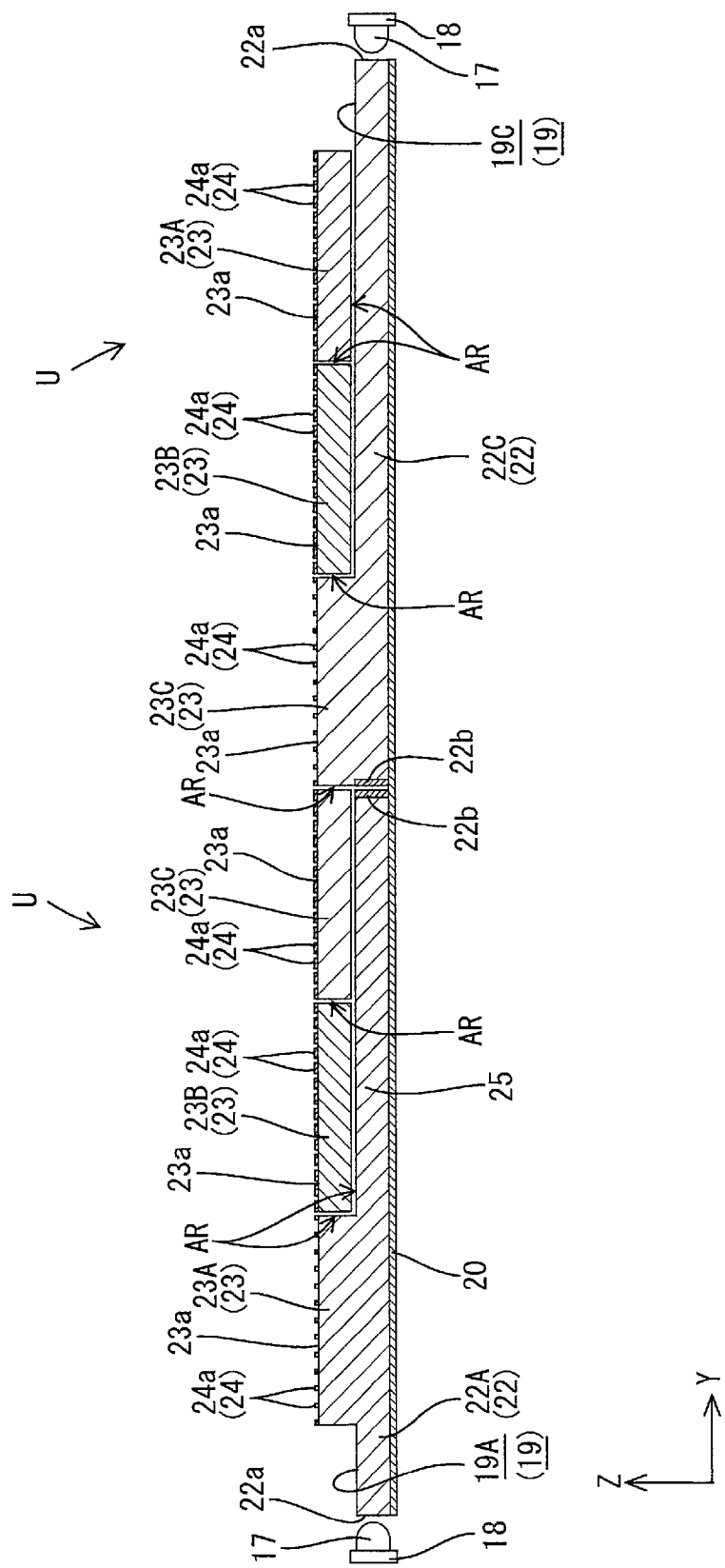
FIG. 7 is a sectional view taken along the line vii-vii of FIG. 5.

As shown in FIGS. 6, 7, and 10, the first light guide member 19A has a configuration in which the first light output portion 23A is arranged at the position of the first light guide portion 22A which is closest to the light entrance surface 22a (LED 17) in the Y-axis direction, and the first light guide portion 22A is arranged at an end of the first light output portion 23A on the left side shown in FIGS. 6 and 10 in the X-axis direction. Accordingly, an end of the first light output portion 23A on the left side shown in FIGS. 6 and 10 serves as the connection portion CA overlapping with the first light guide portion 22A and is directly connected, and a portion of about two thirds on the right side of the figure serves as the non-connection portion CN not overlapping with the first light guide portion 22A and is not directly connected. The first light guide portion 22A has a portion further extending so as to be farther away from the light entrance surface 22a with respect to the first light output portion 23A. This portion serves as a first extending-out portion 25 for securing the optical path length of the light propagating therethrough (FIG. 7). The dimension in the Y-axis direction of the first extending-out portion 25 corresponds to about the dimensions of the second light output portion 23B and the third light output portion 23C described later.

Figure 8:
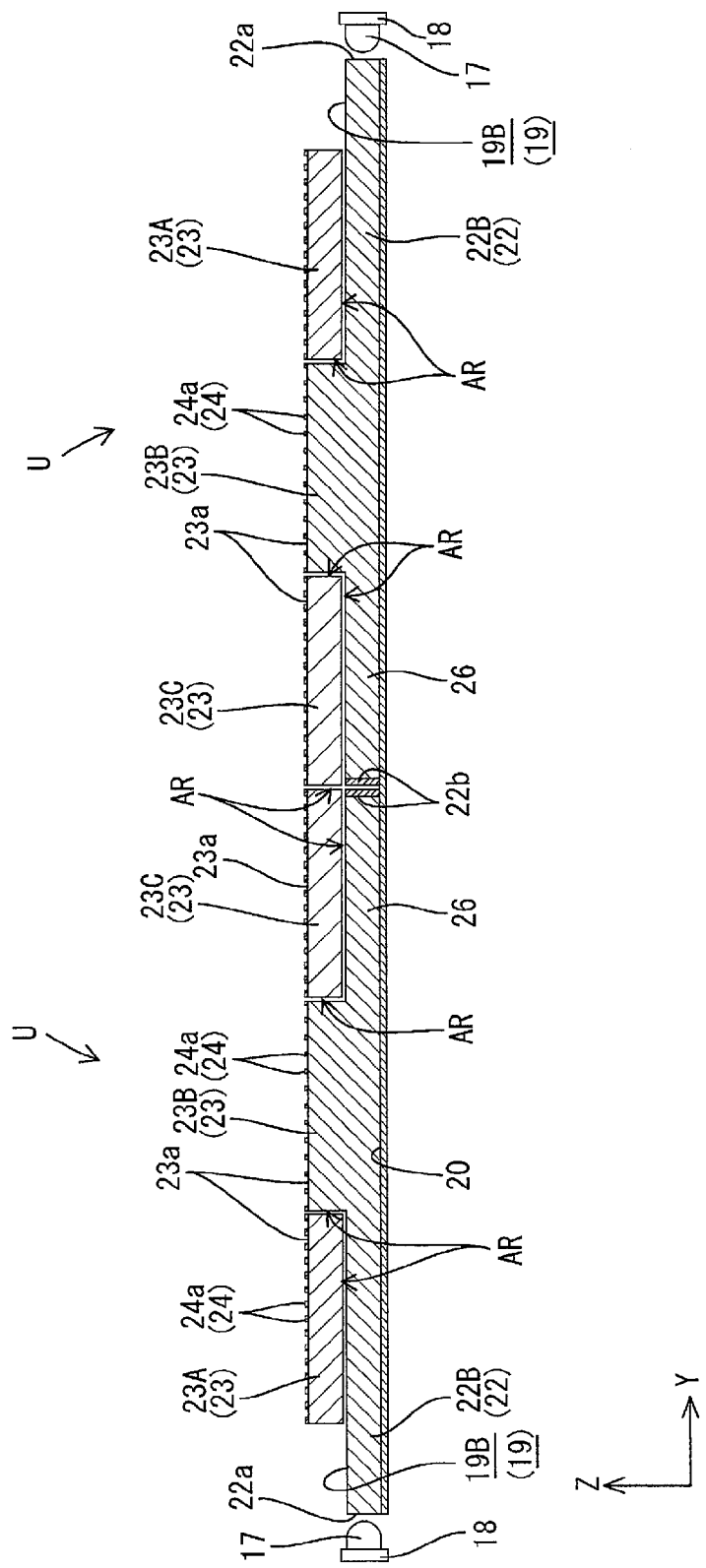
FIG. 8 is a sectional view taken along the line viii-viii of FIG. 5.

As shown in FIGS. 6, 8, and 11, the second light guide member 19B has a configuration in which the second light output portion 23B is arranged at the substantially center position of the second light guide portion 22B in the Y-axis direction, and the second light guide portion 22B is arranged at the substantially center position of the second light output portion 23B in the X-axis direction. Accordingly, the central portion of the second light output portion 23B serves as the connection portion CA overlapping with the second light guide portion 22B and is directly connected, and both side portions sandwiching the connection portion CA serve as a pair of non-connection portions CN not overlapping with the second light guide portion 22B and are not directly connected. The second light guide portion 22B has a portion further extending so as to be farther away from the light entrance surface 22a with respect to the second light output portion 23B. This portion serves as a second extending-out portion 26 (FIG. 8). The dimension in the Y-axis direction of the second extending-out portion 26 is substantially the same as the dimension of the third light output portion 23C described later, and is shorter than the above-described first extending-out portion 25.

Figure 9:
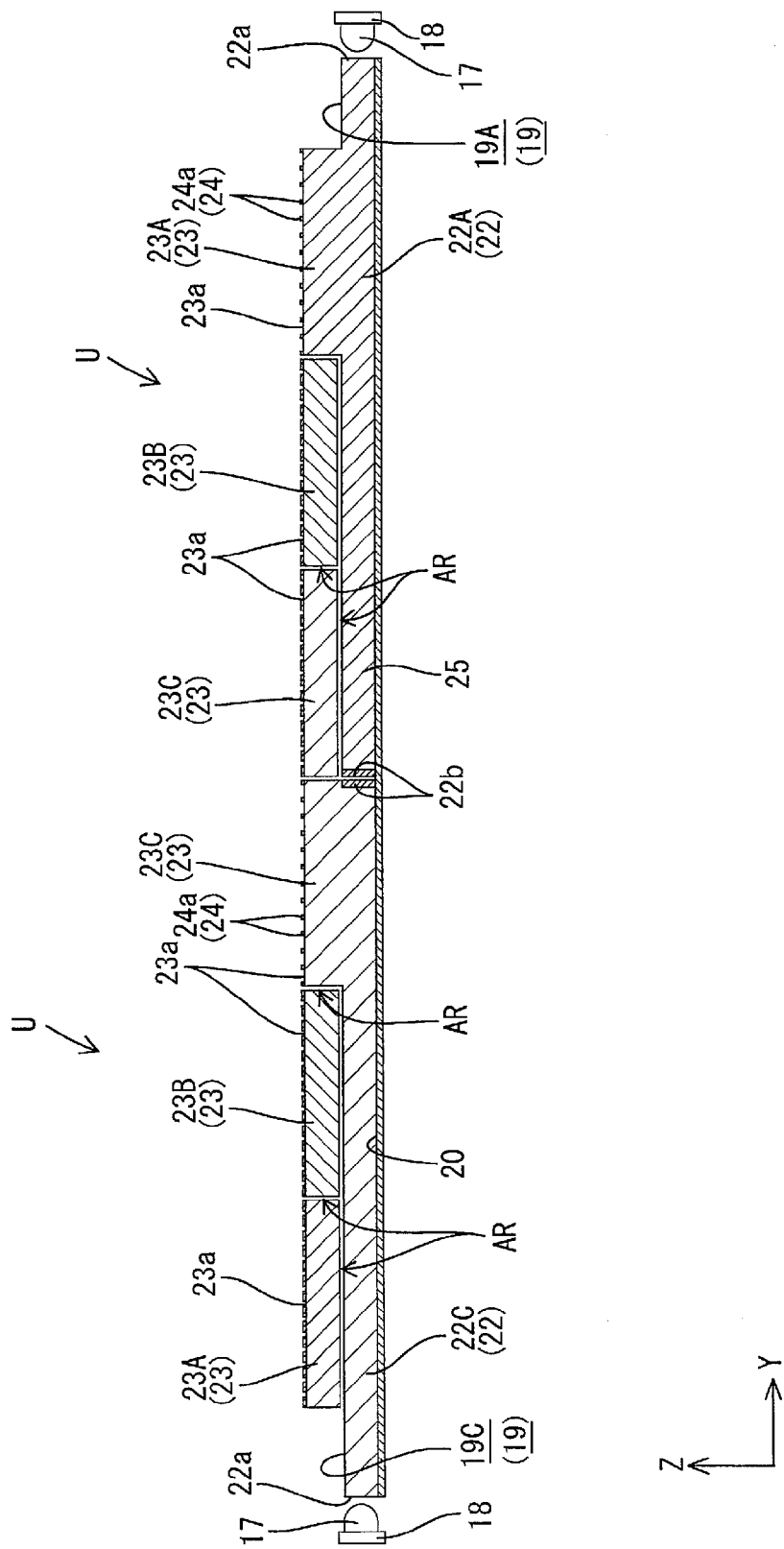
FIG. 9 is a sectional view taken along the line ix-ix of FIG. 5.

As shown in FIGS. 6, 9, and 12, the third light guide member 19C has a configuration in which the third light output portion 23C is arranged at the position farthest from the light entrance surface 22a (LED 17) of the third light guide portion 22C in the Y-axis direction and the third light guide portion 22C is arranged at an end of the third light output portion 23C on the left side shown in FIGS. 6 and 12 in the X-axis direction. Accordingly, an end of the third light output portion 23C on the right side shown in FIGS. 6 and 12 serves as the connection portion CA overlapping with the third light guide portion 22C and is directly connected, and a portion of about two thirds on the left side of the figure serves as the non-connection portion CN not overlapping with the third light guide portion 22C and is not directly connected.

Note that the third light guide portion 22C does not include the extending-out portions 25 and 26, unlike the above-described first light guide portion 22A and second light guide portion 22B.

Figure 5:
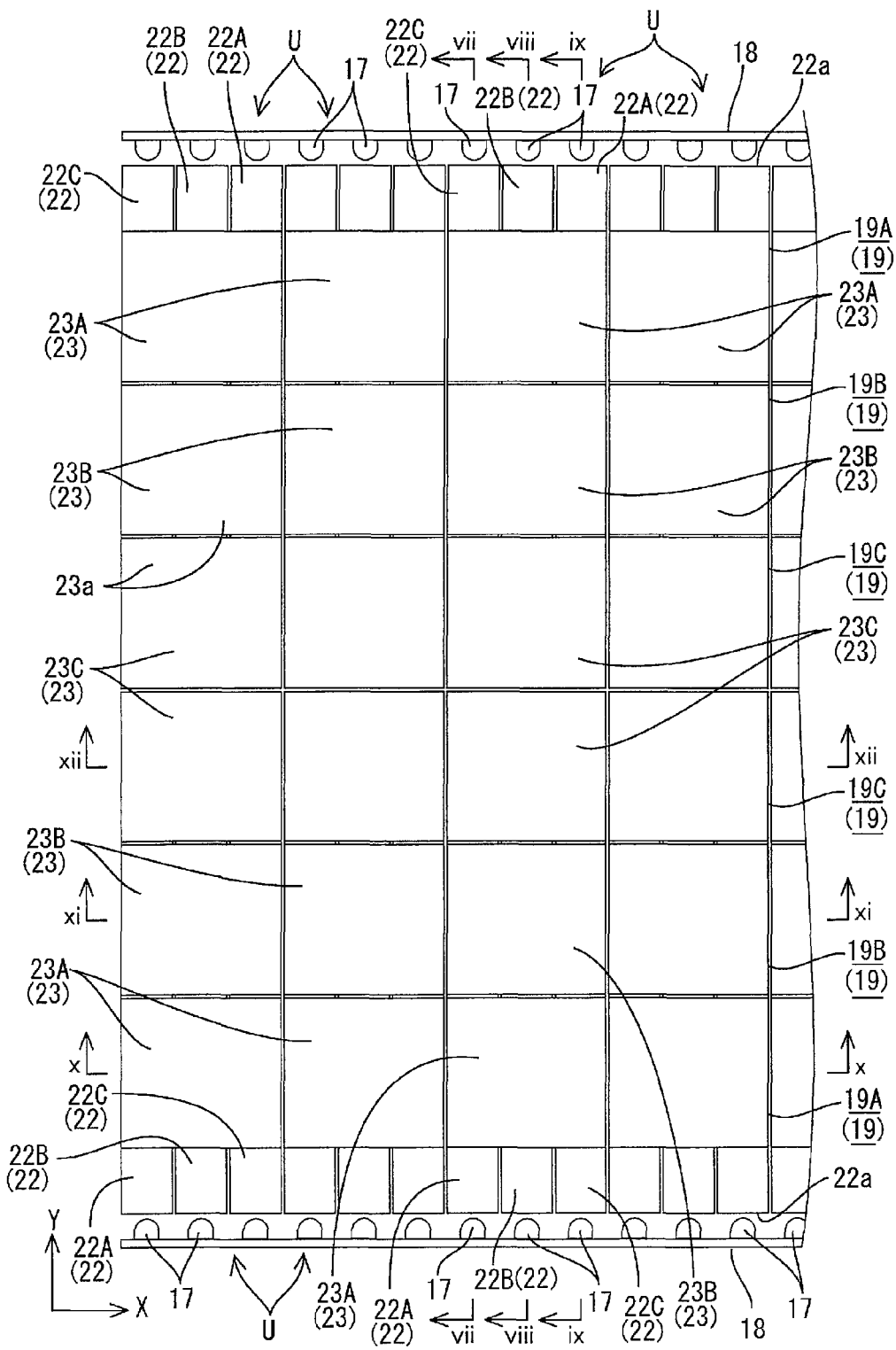
FIG. 5 is a plan view showing planar arrangement of LEDs and light guide members.

A group of the three light guide members 19A to 19C having the configurations described above are assembled within the chassis 14. The relationship among them in the assembled state will now be described in detail. As shown in FIG. 5, the three types of light guide members 19A to 19C are assembled in such a manner that the light guide portions 22A to 22C are linearly arranged parallel to each other along the X-axis direction and the light output portions 23A to 23C are linearly arranged parallel to each other along the Y-axis direction. At this time, the light entrance surfaces 22a of the light guide portions 22A to 22C are substantially flush with each other and the distances from the facing LEDs 17 are substantially uniform. Further, the light exit surfaces 23a of the light output portion 23A to 23C are flush with each other and the distances from the facing optical members 15 are substantially uniform. In this assembled state, the light output portions 23A to 23C in the light guide members 19A to 19C are arranged parallel to each other in the order of the first light output portion 23A, the second light output portion 23B, and the third light output portion 23C from the side of the LEDs 17. Further, the light guide portions 22A to 22C are arranged parallel to each other in the order of the first light guide portion 22A, the second light guide portion 22B, and the third light guide portion 22C from the left side shown in FIG. 5 viewed from the side of the LEDs 17. That is, it can be said that the light guide portions 22A to 22C adjacent to each other in the X-axis direction are optically connected to the light output portions 23A to 23C adjacent to each other in the Y-axis direction.

As shown in FIG. 10, the non-connection portion CN in the first light output portion 23A overlaps with the second light guide portion 22B and the third light guide portion 22C in a plan view, and is arranged to collectively cover these portions from the front side while crossing the portions. Similarly, as shown in FIG. 11, the non-connection portion CN in the second light output portion 23B overlaps with the first light guide portion 22A (first extending-out portion 25) and the third light guide portion 22C in a plan view, and is arranged to cover these portions from the front side while crossing the portions. Similarly, as shown in FIG. 12, the non-connection portion CN in the third light output portion 23C overlaps with the first light guide portion 22A (first extending-out portion 25) and the second light guide portion 22B (second extending-out portion 26) in a plan view, and is arranged to cover these portions from the front side while crossing the portions.

As shown in FIGS. 7 to 12, in the above-described assembled state, air spaces AR are interposed between adjacent ones of the light guide portions 22A to 22C, between adjacent ones of the light output portions 23A to 23C, and between adjacent ones of the light guide portions 22A to 22C and light output portions 23A to 23C, and are held in a non-contact state. The refractive index of each air space AR is sufficiently smaller than that of the material forming each light guide member 19. Accordingly, the light propagating through each of the light guide members 19A to 19C is reflected substantially totally when the light is applied to the boundary surface with each air space AR. Along with the reflection by the reflection sheet 20 and the reflective layer 22b, leakage of internal light is avoided. Accordingly, the optical independence between the light guide members 19A to 19C can be secured, and whether or not to output light from each of the light output portions 23A to 23C can be selectively controlled.

In particular, as shown in FIG. 8, the second light guide portion 22B is optically connected to the second light output portion 23B arranged apart (enter side) from the LEDs 17 with respect to the first light output portion 23A below the back side of the first light output portion 23A. This allows the light from each LED 17 corresponding to the second light guide portion 22B to be directly propagated to the second light output portion 23B without involving the first light output portion 23A. Similarly, as shown in FIGS. 7 and 9, the third light guide portion 22C is optically connected to the third light output portion 23C arranged apart (center side) from the LEDs 17 with respect to the first light output portion 23A and the second light output portion 23B below the back side of the first light output portion 23A and the second light output portion 23B. This allows the light from each LED 17 corresponding to the third light guide portion 22C to be directly propagated to the third light output portion 23C without involving the first light output portion 23A and the second light output portion 23B. As described above, whether or not to output light independently from the other light output portions 23 described above can be controlled with respect to the light output portion 23 (the second light output portion 23B or the third light output portion 23C) which is arranged at the position sandwiching the other light output portions 23 (the first light output portion 23A, or the first light output portion 23A and the second light output portion 23B) with each LED 17.

Assuming that a group of the three light guide members 19A to 19C described above and three LEDs 17 corresponding to the group are referred to as a light-emitting unit U, a plurality of (10 in FIG. 2) light-emitting units U is arranged parallel to each other in the X-axis direction and each pair of light emitting units is arranged such that a surface of each light emitting unit U farthest away from the LEDs 17 faces each other in the Y-axis direction in the chassis 14 as shown in FIGS. 2 and 5. That is, the same component is used for all the light guide members 19A to 19C forming each of the light-emitting units U arranged parallel to each other in the X-axis direction and the light guide members 19A to 19C forming a pair of light-emitting units U arranged across the center position in the Y-axis direction in the chassis 14. In the pair of light-emitting units U arranged across the center position in the Y-axis direction, the arrangement of the group of the light guide members 19A to 19C is inverted. The light emitting surface of the entire backlight unit 12 is formed by an assembly of the light exit surfaces 23a of the light output portions 23A to 23C constituting each of the light-emitting units U.

The present embodiment has a configuration as described above, and the operation thereof will be subsequently described. When the power source of the liquid crystal display device 10 is turned on, driving of the liquid crystal panel 11 is controlled by a control circuit, which is not shown, and driving of each LED 17 of the backlight unit 12 is controlled to thereby radiate illumination light to the liquid crystal panel 11. Thus, a predetermined image is displayed on the liquid crystal panel 11. The operation of the backlight unit 12 will be described below in detail.

Specifically, when each of the LEDs 17 is turned on, the light which exits from each LED 17 enters the light entrance surface 22a of each light guide portion 22 as shown in FIGS. 7 to 9. The light entering each light guide portion 22 from each light entrance surface 22a is reflected by the reflection sheet 20 or the reflective layer 22b, or is totally reflected by the boundary surface with each external air space AR, and is effectively propagated through the inside without leakage. Then, the light enters into the light output portion 23 side. In particular, the reflective layer 22b, which is arranged to face the LEDs 17 serving as light sources having high directivity, can effectively reflect light with high intensity along the light axis of each LED 17. Note that in the first light guide member 19A and the second light guide member 19B, the light guide portions 22A and 22B respectively include the extending-out portions 25 and 26 extending so as to be farther away from the light entrance surface 23a with respect to the light output portions 23A and 23B. Accordingly, by allowing the light within the extending-out portions 25 and 26, the optical path length of which tends to be shorter than the third light guide portion 22C, can be secured to be equal to that of the third light guide portion 22C. The above-described optical path length can be sufficiently secured to thereby allow the light to reach each of the light output portions 23A and 23B in the Y-axis direction. Therefore, unevenness in the Y-axis direction hardly occurs in the light introduced into each of the light output portions 23A and 23B.

The light introduced into each light output portion 23 is totally reflected by the boundary surface with each air space AR in each light output portion 23, for example, and then reaches each light exit surface 23a. When the light is applied to the light scattering portion 24 formed on the light exit surface 23a, the light is scattered to generate light with an incidence angle smaller than the critical angle, and the most part of the light is allowed to exit to the outside from the light exit surface 23a. Note that the light applied to a non-forming portion of the light scattering portion 24 on the light exit surface 23a is totally reflected and propagated again through each light output portion 23. As shown in FIGS. 10 to 12, in each light scattering portion 24, the area of each dot 24a is minimum in the connection portion CA of the light output portion 23. In the non-connection portion CN, the area of each 24a is larger than the connection portion CA and increases as the distance from the connection portion CA. On the other hand, the amount of light existing in the light output portions 23 is largest in the connection portion CA directly connected to each light guide portions 22, while in the non-connection portion CN, which is not directly connected to the light guide portions 22, the amount of light decreases as the distance from the connection portion CA. That is, the light scattering degree of the light scattering portion 24 of each light exit surface 23a has a distribution in reverse proportion to the amount of light existing in each light output portion 23. Accordingly, the light scattering degree is low and outgoing of light is suppressed in the connection portion CA where the amount of light is large. Meanwhile, in the non-connection portion CN where the amount of light is small, the light scattering degree is high and outgoing of light is promoted. Thus, the light which exits from each light exit surface 23a is uniform within the plane and the occurrence of unevenness is avoided.

Turning on each LED 17 as described above allows the light from the light exit surface 23a of each of the light output portions 23, which are included in the respective light guide members 19, to exit, and allows the planar light from the light emitting surface of the entire backlight unit 12, which is formed by the assembly of the light exit surfaces 23a, to exit. In the present embodiment, the optical independence between the light guide members 19 can be secured and driving of each LED 17 is controlled according to an image to be displayed, thereby making it possible to individually control whether or not to output light from each light output portion 23. For example, when a black display area and a non-black display area are included in the image to be displayed, only the LEDs 17 optically connected to the light output portions 23 arranged to supply light mainly to the non-black display area (specifically, for example, arranged to overlap with the non-black display area in a plan view) are turned on, thereby allowing light to exit from each light output portion 23. On the other hand, the LEDs 17 optically connected to the light output portions 23 arranged to supply light mainly to the black display area (specifically, for example, arranged to overlap with the black display area in a plan view) are turned off, thereby preventing light from exiting from each light output portion 23. With this configuration, a large difference in contrast between the black display area and the non-black display area can be secured and thereby obtaining a high contrast performance and an excellent display quality. In addition, low power consumption can be achieved.

In particular, as shown in FIG. 5, the present embodiment has a feature that the LEDs 17 are arranged in an aggregated manner at both ends of the backlight unit 12 in the Y-axis direction and whether or not to output light from each of the light output portions 23 arranged parallel to each other in the Y-axis direction can be selectively controlled. Specifically, the LEDs 17 arranged at both ends in the Y-axis direction are optically connected to the respective output portions 23 arranged parallel to each other in the Y-axis direction through the light guide portions 22. Among these, the second light output portion 23B arranged at the position (center side) sandwiching the first light output portion 23A with each LED 17 is optically connected to the corresponding LED 17 through the second light guide portion 22B arranged below the back side of the first light output portion 23A as shown in FIG. 8. This configuration permits the control in which the first light output portion 23A is allowed to output light and the second light output portion 23B is prevented from outputting light, for example. Similarly, the third light output portion 23C arranged at the position (center side) sandwiching the first light output portion 23A and the second light output portion 23B with the LEDs 17 is optically connected to the corresponding LED 17 through the third light guide portion 22C arranged below the back side of the first light output portion 23A and the second light output portion 23B as shown in FIGS. 7 and 9. This configuration permits the control in which the first light output portion 23A or the second light output portion 23B is allowed to output light and the third light output portion 23C is prevented from outputting light, for example. In this manner, whether or not to output light from each of the light output portions 23 arranged parallel to each other in the Y-axis direction can be selectively controlled. Accordingly, as compared to the case where only one light output portion is arranged in the Y-axis direction, a light emitting area and a non-light-emitting area of the backlight unit 12 can be controlled more finely according to the image to be displayed, and a more excellent contrast performance is provided. Note that it is also possible to selectively control whether or not to output light from each of the light output portions 23 arranged parallel to each other in the X-axis direction. On the other hand, the LEDs 17 are arranged in an aggregated manner at the ends of the backlight unit 12 in the Y-axis direction. Thus, as compared to the case where the LEDs are also arranged at the center side in a dispersed manner, an installation work during an assembling process can be easily carried out and the wiring configuration of the LEDs 17 can be simplified.

As described above, the backlight unit 12 of the present embodiment includes the LEDs 17 serving as a plurality of light sources arranged parallel to each other at ends; the plurality of light guide portions 22 which is arranged along the arrangement direction (X-axis direction) of the LEDs 17 and which receives light from the LEDs 17; and the plurality of light output portions 23 which is arranged parallel to each other in the direction (Y-axis direction) crossing the arrangement direction of the LEDs 17 and which allow light from the light guide portions 22 to exit. The plurality of light output portions 23 includes the first light output portion 23A arranged at least relatively to the LEDs 17 side, and the second light output portion 23B arranged so as to be farther away from the LEDs 17 (close to a middle portion) relative to the first light output portion 23A. The plurality of light guide portions 22 includes the first light guide portion 22A optically connected to the first light output portion 23A, and the second light guide portion 22B optically connected to the second light output portion 23B.

The backlight unit 12 is a so-called edge light type in which the plurality of LEDs 17 is arranged parallel to each other at the ends thereof, which achieves reduction in thickness compared to the direct type. Further, since the LEDs 17 are arranged in an aggregated manner at the ends of the backlight unit 12, the work for installing the LEDs 17 can be facilitated and the wiring configuration can be simplified, as compared to the case where the LEDs are also arranged at the center side. Beside this, according to the present embodiment, the plurality of light output portions 23 arranged parallel to each other in the direction crossing the arrangement direction of the LEDs 17 includes the first light output portion 23A arranged at least relatively to the side of the LEDs 17, and the second light output portion 23B arranged farther away from the LEDs 17 relative to the first light output portion 23A. Further, the first light guide portion 22A is optically connected to the first light output portion 23A, and the second light guide portion 22B is optically connected to the second light output portion 23B. For example, turning on each LED 17 corresponding to the first light guide portion 22A and turning off each LED 17 corresponding to the second light guide portion 22B permits the control in which the first light output portion 23A is allowed to output light and the second light output portion 23B is prevented from outputting light, for example. That is, whether or not to output light from each of the light output portions 23 can be selectively controlled by driving the LEDs 17 respectively corresponding to the light guide portions 22. According to the present embodiment, it is possible to provide the backlight unit 12 configured to control whether or not to partially emit light while arranging the LEDs 17 at ends in an aggregated manner, and the liquid crystal display device 10 using the backlight unit 12.

The light output portions 23 are arranged to overlap with the optically connected light guide portions 22 on the light exit side (front side). With this configuration, the length of each of the light guide portions 22 is greater than that in the case where the light guide portions and the light output portions are arranged parallel to each other along the arrangement direction of the light output portions so as not to overlap with each other. Accordingly, a sufficient optical path length of light propagating through the light guide portion 22 can be secured and the light can be allowed to reach a wide range of the light output portion 23. Therefore, unevenness hardly occurs in the light introduced to the light output portions 23 and in the light which exits from each light output portion 23.

The first light output portion 23A is arranged to overlap with the second light guide portion 22B, which is optically connected to the second light output portion 23B, on the light exit side. With this configuration, the second light guide portion 22B optically connected to the second light output portion 23B that is provided farther away from the LEDs 17 with respect to the first light output portion 23A is covered by the first light output portion 23A from the light exit side. This prevents the second light guide portion 22B from being viewed as a dark portion. As compared to the case where the second light guide portion is formed in a shape bypassing the first light portion 23A so as not to overlap with the first light output portion 23A, the shape of the second light guide portion 22B can be simplified.

The plurality of light output portions 23 is arranged parallel to each other along the direction (Y-axis direction) orthogonal to the arrangement direction of the LEDs 17 and has the same dimension in the arrangement direction of the LEDs 17. The size thereof is substantially the same as the size obtained by adding the dimensions of the light guide portions 22 optically connected to the plurality of light output portions 23. With this configuration, the entire area of each of the plurality of light guide portions 22 arranged parallel to each other along the arrangement direction of the LEDs 17 can be covered from the light exit side by the light output portion 23. Further, the dimensions of the plurality of light output portions 23, which is arranged parallel to each other along the direction orthogonal to the arrangement direction of the LEDs 17, in the arrangement direction of the LEDs 17 are substantially the same. This enables uniform arrangement of the light output portions 23 within the plane of the light emitting surface of the backlight unit 12.

Further, at least the first light guide portion 22A has the first extending-out portion 25 extending so as to be farther away from the LEDs 17 with respect to the first light output portion 23A. With this configuration, the optical path length of light propagating through the first light guide portion 22A can be increased by the amount corresponding to the first extending-out portion 25. As a result, unevenness hardly occurs in the light introduced to the first light output portion 23A. In the present embodiment, the second light guide portion 22B also includes the second extending-out portion 26.

The first extending-out portion 25 includes the second light output portion 23B so as to overlap with the first extending-out portion 25 on the light exit side. With this configuration, the first extending-out portion 25 is covered from the light exit side by the second light output portion 23B, thereby preventing the first extending-out portion 25 from being viewed as a dark portion.

Each light output portion 23 has the light exit surface 23a that allows light to exit, and the light exit surface 23a includes the light scattering portion 24 that allows the light to be scattered. With this configuration, the light within each light output portion 23 is scattered by the light scattering portion 24, thereby promoting outgoing of the light from each light exit surface 23a.

The dimension of the light output portions 23 in the arrangement direction of the LEDs 17 is greater than that of the light guide portion 22. The light scattering degree of the light scattering portion 24 is greater in the portion overlapping with the light guide portion 22 (connection portion CA) than in that of the portion not overlapping with the light guide portion 22 (non-connection portion CN). With this configuration, in the light output portion 23, the amount of light existing in the portion not overlapping with the light guide portion 22 (non-connection portion CN) is smaller than the amount of light existing in the portion overlapping with the light guide portion 22 (connection portion CA). Meanwhile, the light scattering degree of the light scattering portion 24 provided on each light exit surface 23a is greater in the portion not overlapping with the light guide portion 22 (not-connection portion CN), than in the portion overlapping with the light guide portion 22 (connection portion CA). Accordingly, in the portion where the amount of light existing the light output portion 23 is large, outgoing of the light is suppressed. On the other hand, in the portion where the amount of light existing therein is small, outgoing of the light is promoted. As a result, unevenness hardly occurs in the distribution of the outgoing light within the plane of each light exit surface 23a.

The light scattering degree of the light scattering portion 24 increases in the direction away from each light guide portion 22. With this configuration, the distribution of the outgoing light can be made uniform in the portion overlapping with the light guide portion 22 and the portion not overlapping with the light guide portion 22 in each light output portion 23.

The reflective layer 22b that reflects light is formed at the end of the light guide portion 22 on the opposite side from the end face facing the LEDs 17. With this configuration, the light reaching the end face of the light guide portion 22 on the opposite side from the end face facing the LEDs 17 can be reflected by the reflective layer 22b and directed toward the light output portion 23. In particular, this configuration is effective when the LEDs 17 having high directivity are used.

The light guide portions 22 and the light output portions 23 are integrally formed. With this configuration, the light can be introduced from the light guide portions 22 to the light output portions 23 without being refracted, thereby enhancing the use efficiency of light. Further, the number of components can be reduced and assembling can be facilitated.

The light guide portions 22 adjacent to each other in the arrangement direction of the LEDs 17 are optically connected to the light output portions 23 adjacent to each other in the direction crossing the arrangement direction of the LEDs 17. With this configuration, the arrangement of the light guide portions 22 and the light output portions 23, which are optically connected, can be simplified, thereby facilitating the installation work thereof.

The plurality of light output portions 23 arranged parallel to each other in the direction crossing the arrangement direction of the LEDs 17, the plurality of light guide portions 22 optically connected to the respective light output portions 23, the plurality of LEDs 17 for supplying light to each of the light guide portions 22 constitute a single light-emitting unit U. A plurality of light-emitting units U is arranged parallel to each other along the arrangement direction of the LEDs 17. With this configuration, an increase in the area of the light emitting surface of the backlight unit 12 can be achieved.

The plurality of light output portions 23 arranged parallel to each other in the direction crossing the arrangement direction of the LEDs 17, the plurality of light guide portions 22 optically connected to the respective light output portions 23, and the plurality of LEDs 17 for supplying light to each of the light guide portions 22 constitute a single light-emitting unit U. At least a pair of light-emitting units U is arranged such that a surface of each light emitting unit U farthest away from the LEDs 17 faces each other. With this configuration, an increase in the area of the light emitting surface of the backlight unit 12 can be achieved.

The light sources serve as the LEDs 17. With this configuration, high brightness etc. can be achieved.

The LEDs 17 are mounted on the LED boards 18 extending along the arrangement direction of the light guide portions 22. With this configuration, the arrangement of the LEDs 17 and the wiring between the LEDs 17 can be facilitated.

The air spaces AR are interposed between the adjacent light guide portions 22 and between the adjacent light output portions 23, as the low refractive index layer having a refractive index lower than that of the light guide portions 22 and the light output portions 23. With this configuration, the light within each light guide portion 22 is reflected substantially totally when the light is applied to the boundary surface with the air spaces AR, thereby allowing the light to be effectively propagated to the light output portions 23. Similarly, the light within each light output portion 23 is reflected substantially totally when the light is applied to the boundary surface with the air spaces AR, thereby avoiding the leakage of light to the side of the adjacent light output portions 23 and securing the optical independence.

The low refractive index layer serves as each air space AR. This configuration eliminates the need for a special member for forming the low refractive index layer, which contributes to cost reduction.

The reflection sheet 20 serving as the reflection member that reflects light is arranged on the surface of the light guide portion 22 on the opposite side from the light exit side of the light guide portion 22. With this configuration, the light reaching the surface on the opposite side from the light exit side within the light guide portion 22 is reflected by the reflection sheet 20, thereby allowing the light to be effectively propagated to the light output portions 23.

The reflection sheet 20 is formed over the range of the plurality of light guide portions 22. With this configuration, as compared to the case where the reflection sheet is divided for each light guide portion 22, the manufacturing and installation costs can be reduced.

Second Embodiment

A second embodiment of the present invention will be described with reference to FIGS. 13 to 15. In the second embodiment, locations where each light scattering portion 124 is formed are changed. Note that a repeated explanation of the configuration, operation, and effect similar to those of the above-described first embodiment will be omitted.

Figure 13:
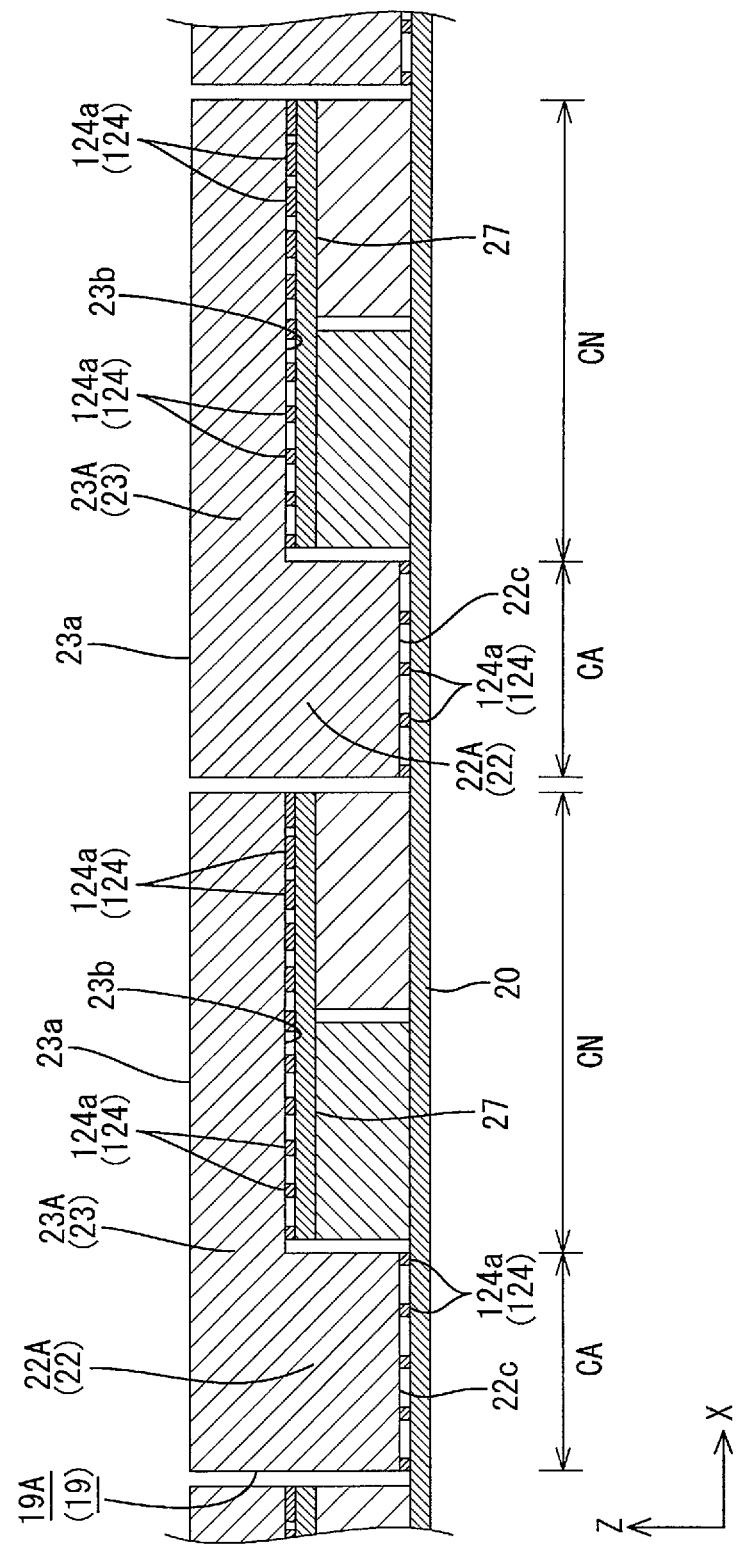
FIG. 13 is a sectional view showing a first light guide portion and a first light output portion which constitute a first light guide member according to a second embodiment of the present invention.
Figure 14:
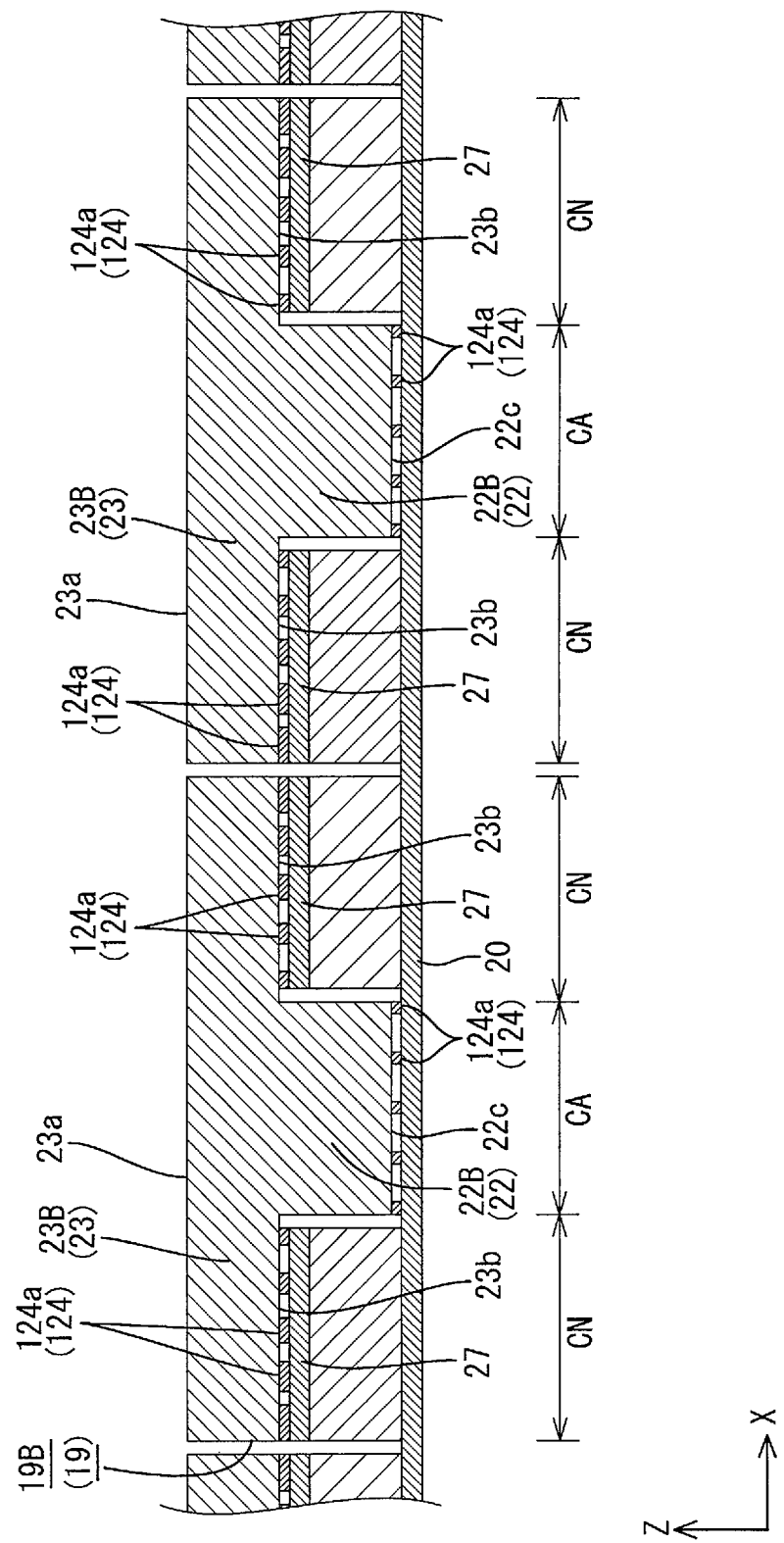
FIG. 14 is a sectional view showing a second light guide portion and a second light output portion which constitute a second light guide member.
Figure 15:
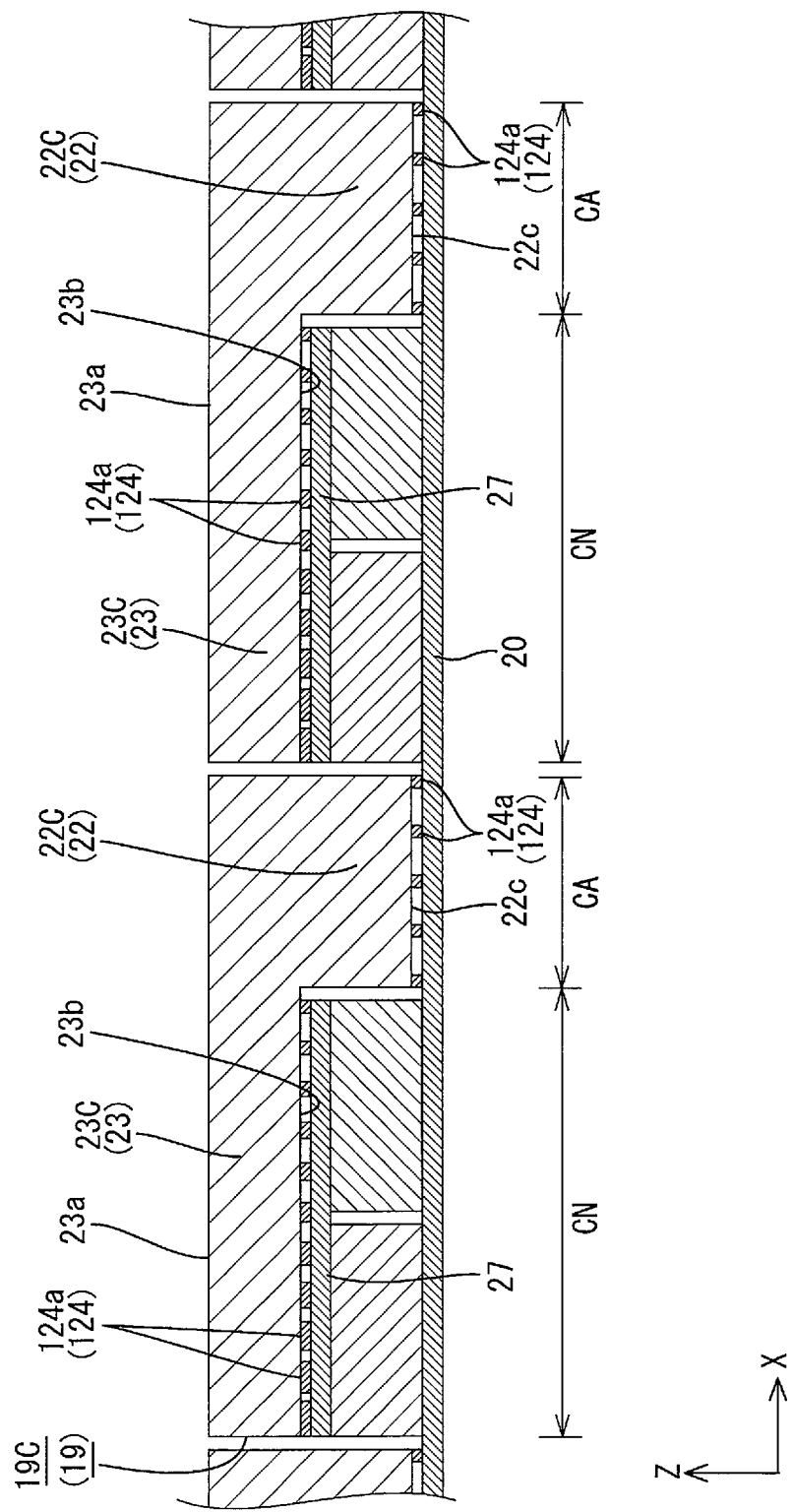
FIG. 15 is a sectional view showing a third light guide portion and a third light output portion which constitute a third light guide member.
Figure 16:
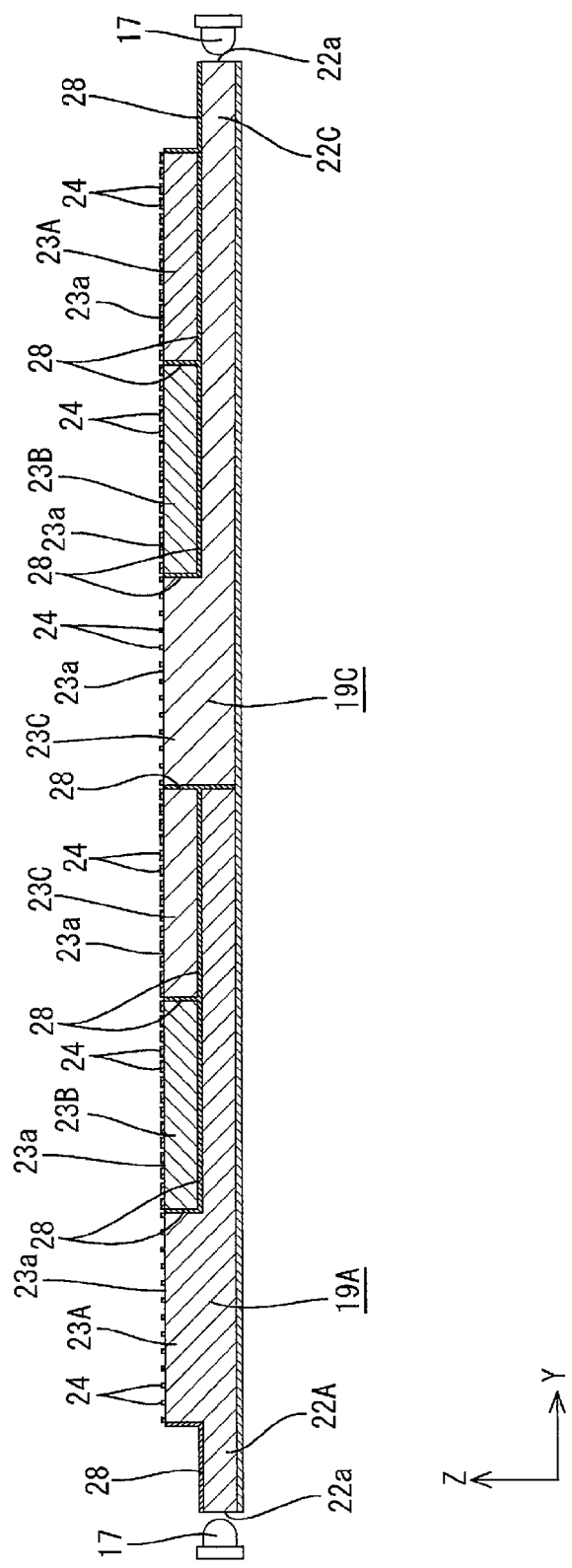
FIG. 16 is a sectional view taken along the line vii-vii of FIG. 5 showing an arrangement configuration of light guide members according to a third embodiment of the present invention.
Figure 17:
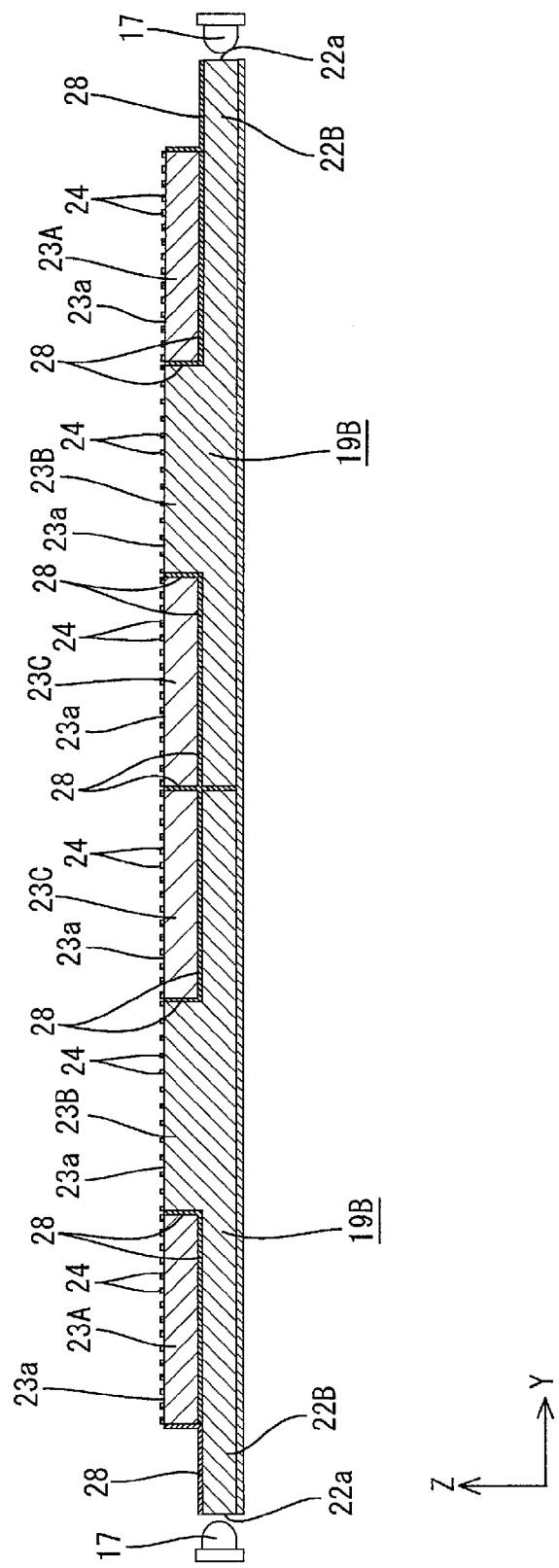
FIG. 17 is a sectional view taken along the line viii-viii of FIG. 5 showing an arrangement configuration of light guide members.
Figure 18:
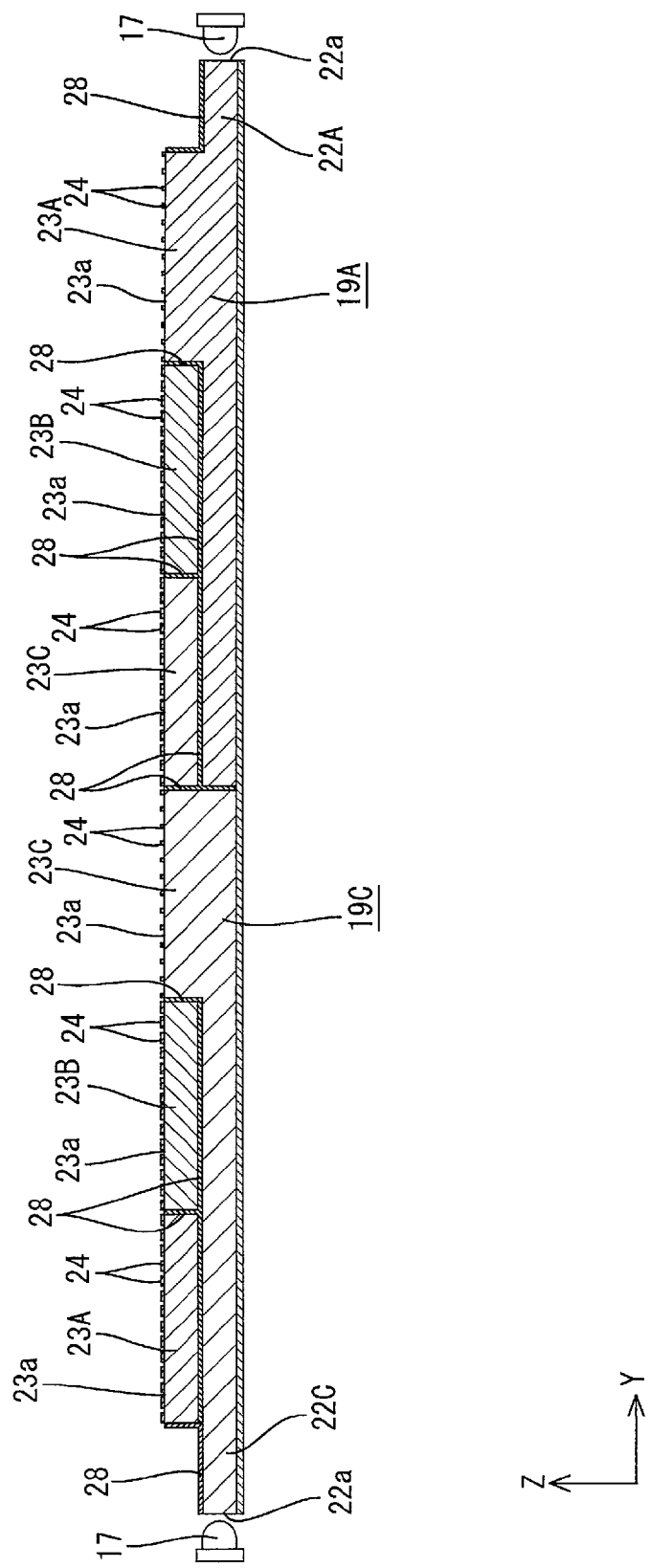
FIG. 18 is a sectional view taken along the line ix-ix of FIG. 5 showing an arrangement configuration of light guide members.
Figure 19:
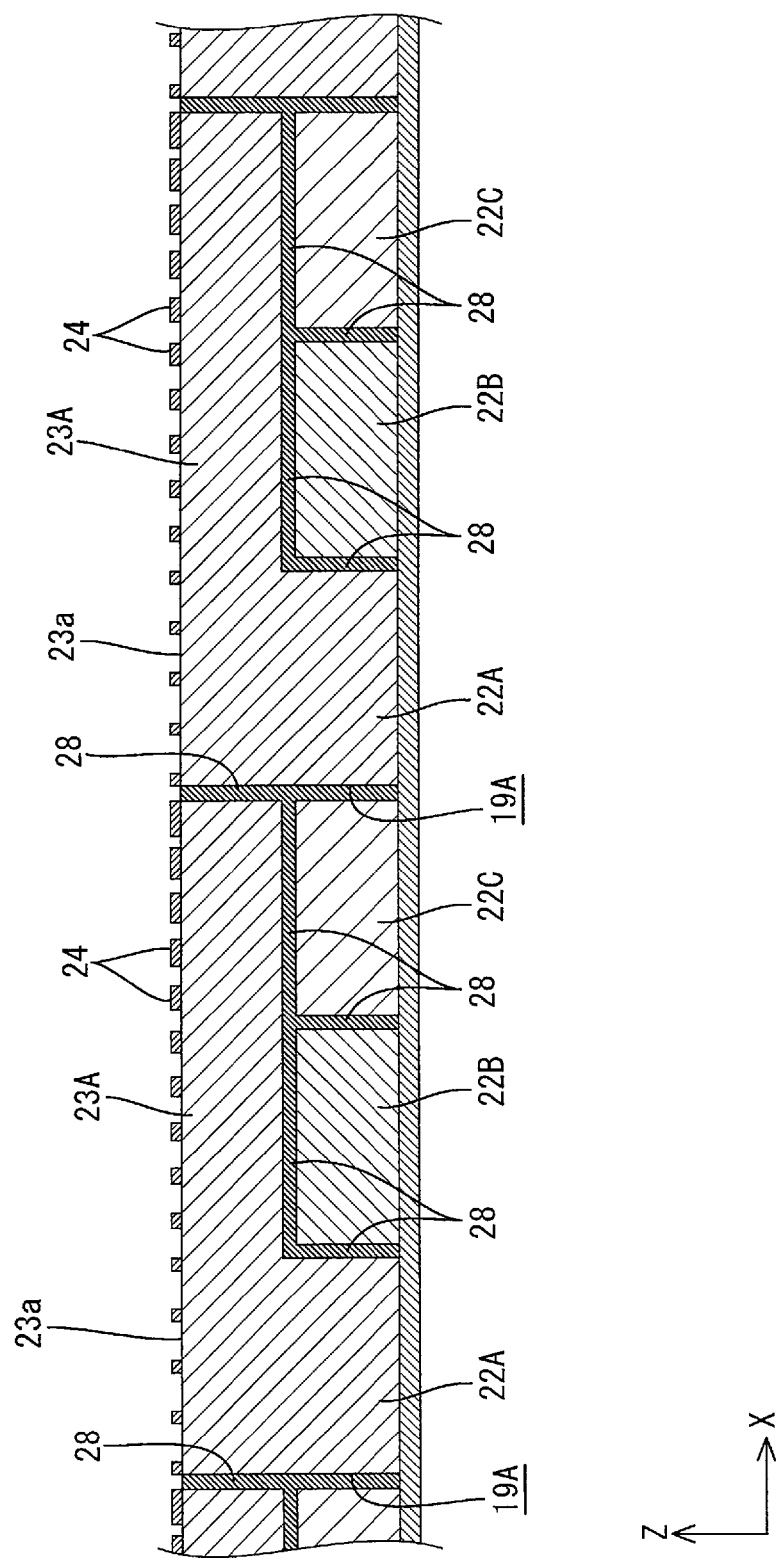
FIG. 19 is a sectional view taken along the line x-x of FIG. 5 showing an arrangement configuration of light guide members.
Figure 20:
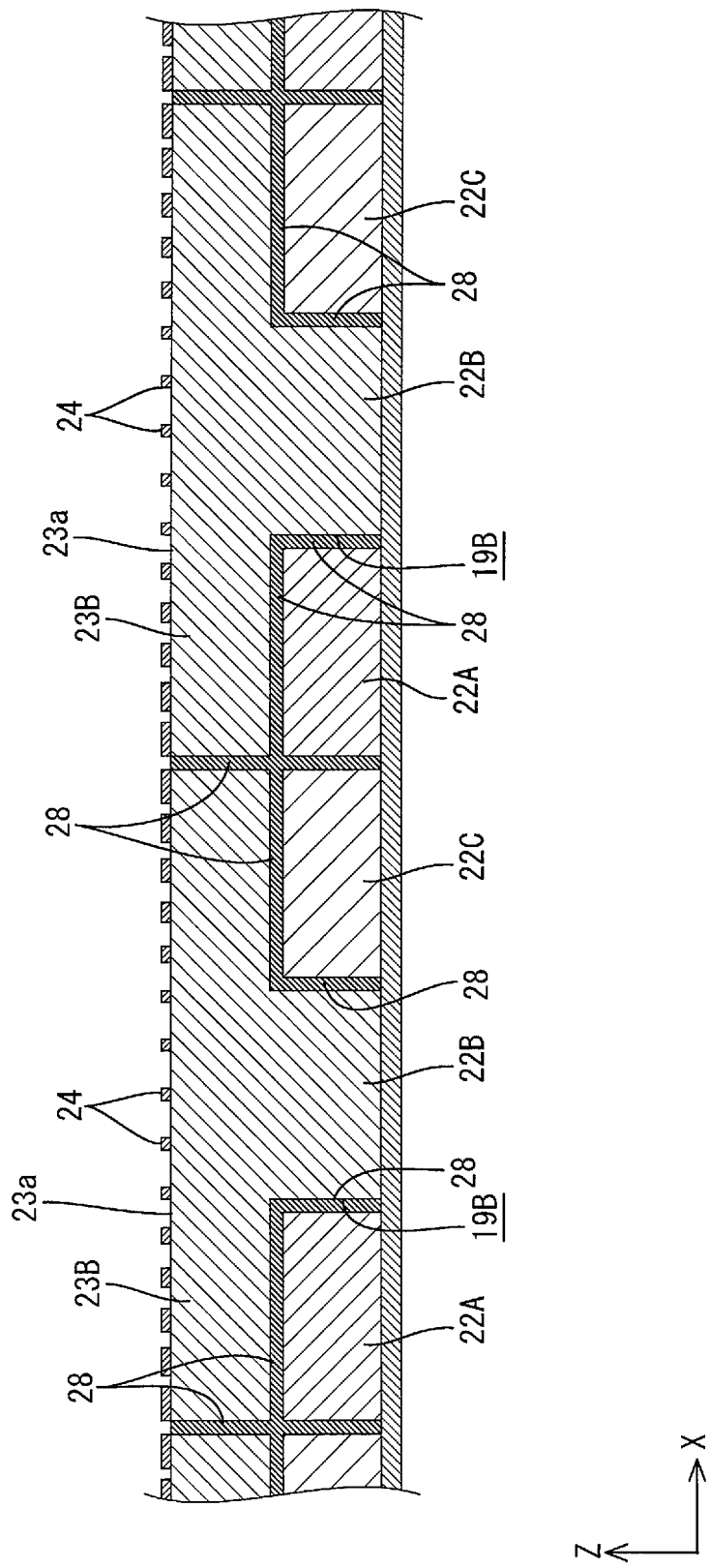
FIG. 20 is a sectional view taken along the line xi-xi of FIG. 5 showing an arrangement configuration of light guide members.
Figure 21:
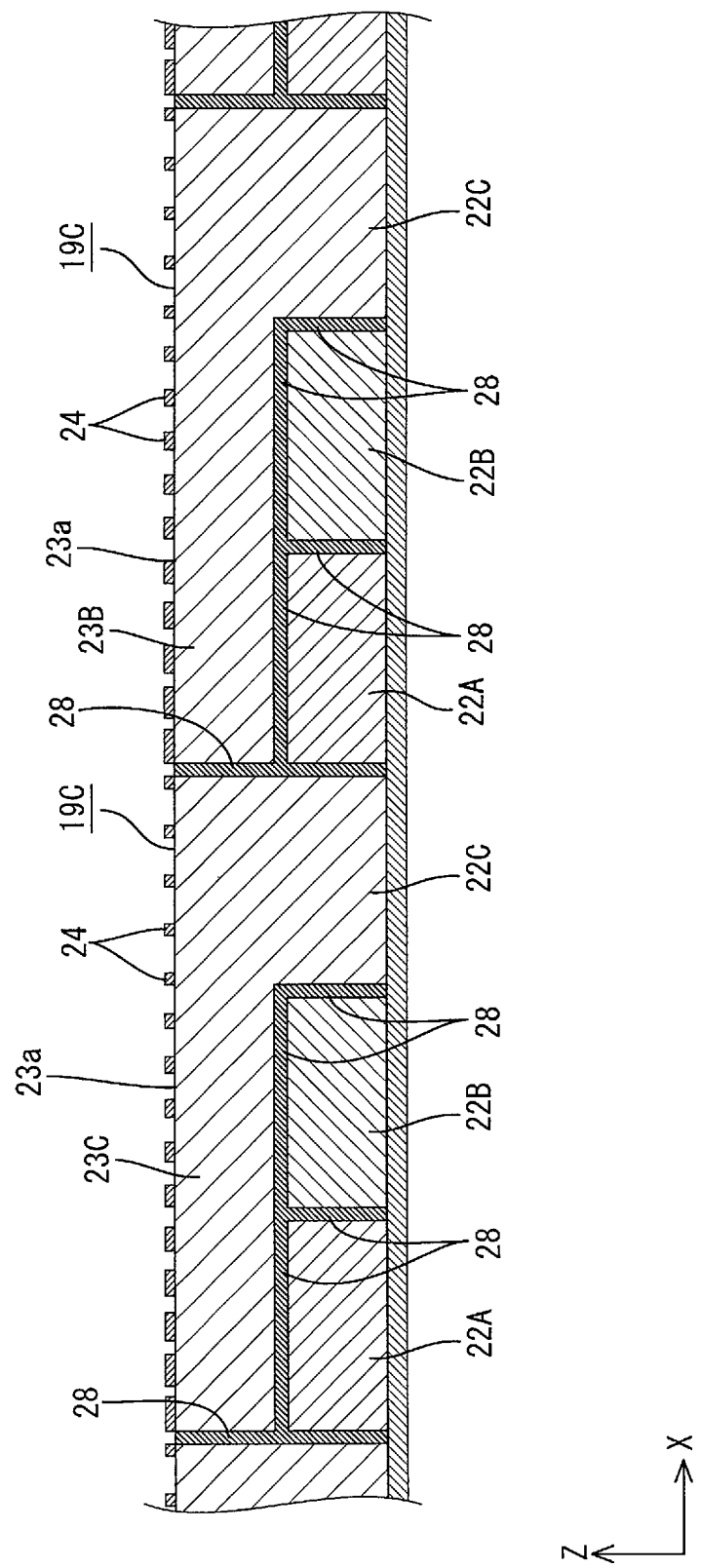
FIG. 21 is a sectional view taken along the line xii-xii of FIG. 5 showing an arrangement configuration of light guide members.

As shown in FIGS. 13 to 15, each light scattering portion 124 is formed on the back surface 22c of each light guide portion 22 overlapping with each light output portion 23 in a plan view, and on the back surface 23b of the light output portion 23 in the non-connection portion CN. The light scattering portion 124 formed on the back surface 22c of the portion of each light guide portion 22 overlapping with each light output portion 23 in a plan view, is sandwiched with the reflection sheet 20. On the other hand, the back surface 23b in the non-connection portion CN of each light output portion 23 is mounted with a second reflection sheet 27 through the light scattering portion 124. Note that the distribution of the dots 124a forming the light scattering portion 124 in the X-axis direction is similar to that of the above-described first embodiment, so a repeated explanation thereof is omitted.

Light reaching the portion overlapping with the light output portions 23 in a plan view in each light guide portion 22 is split into light entering the light output portions 23 without hitting the light scattering portion 124 of the back surface 22c, and light hitting the light scattering portion 124. The light hitting the light scattering portion 124 on the back surface 22c is scattered and reflected by the reflection sheet 20 and enters each light output portion 23. Accordingly, the light directly exits from the light exit surface 23a. On the other hand, the light entering the light output portion 23 without being applied to the light scattering portion 124 of the back surface 22c of the light guide portion 22 is applied to the light scattering portion 124 on the back surface 23b of the non-connection portion CN and scattered in the process of propagating through the light output portion 23, and is reflected by the second reflection sheet 27. Accordingly, the light reaches the light exit surface 23a and directly exits therefrom.

Third Embodiment

A third embodiment of the present invention will be described with reference to FIGS. 16 to 21. The third embodiment is a modified example of the first embodiment, and illustrates a configuration in which a reflective layer 28 is added to improve the optical independence of each of the light guide members 19A to 19C. Note that a repeated explanation of the configuration, operation, and effect similar to those of the above-described first embodiment will be omitted.

As shown in FIGS. 16 to 21, the reflective layer 28 that reflects light is provided to cover the substantially entire area of the outer peripheral surface of each of the light guide members 19A to 19C, except for each light entrance surface 22a and each light exit surface 23a. That is, the reflective layer 28 is interposed between the adjacent light guide members 19A to 19C. Specifically, the reflective layer 28 is interposed between the light guide portions 22A to 22C (FIGS. 19 to 21) adjacent to each other in the X-axis direction, between the light guide portions 22A to 22C (FIGS. 16 to 18) adjacent to each other in the Y-axis direction, between the light output portions 23A to 23C (FIGS. 19 to 21) adjacent to each other in the X-axis direction, between the light output portions 23A to 23C (FIGS. 16 to 18) adjacent to each other in the Y-axis direction, and between the light guide portions 22A to 22C and the light output portion 23A to 23C (FIGS. 16 to 21) adjacent to each other in the Z-axis direction.

When the light incident within each of the light guide members 19A to 19C from each of the LEDs 17 propagates through the light guide portions 22A to 22C and reaches the light output portions 23A to 23C, the light is scattered by the light scattering portion 24 on the light exit surface 23a to thereby promote outgoing of the light to the outside. However, the light scattered by the light scattering portion 24 includes some part of the light that is returned to the inside of the light output portions 23A to 23C without exiting to the outside. When the returned light reaches the boundary surface with the outside of the light output portions 23A to 23C through which the light is propagated, the returned light is reflected by the reflective layer 28, thereby reliably avoiding the light from leaking to the outside. As a result, the light is reliably prevented from coming and going between the light output portions 23A to 23C and the adjacent light output portions 23A to 23C or light guide portions 22A to 22C. The light reflected by the reflective layer 28 is propagated again through the light output portions 23A to 23C or the light guide portions 22A to 22C and reaches the light exit surface 23a again and finally exits therefrom. Also in the process in which the light is propagated through the light guide portions 22A to 22C, the light is reflected by the reflective layer 28, thereby making it possible to reliably guide the light to the light output portions 23A to 23C.

In this manner, leakage of light to the outside from each of the light output portions 23A to 23C and the light guide portions 22 to 22C by the reflective layer 28 can be accurately avoided, thereby enhancing the use efficiency of light and maximizing the amount of outgoing light. As a result, higher brightness can be obtained. Additionally, mixing of the light between the adjacent light output portions 23A to 23C (between the light guide members 19A to 19C) can be reliably avoided, thereby enhancing the optical independence of each of the light output portions 23A to 23C. Consequently, whether or not to output light to each of the light output portions 23A to 23C can be reliably controlled, thereby obtaining an extremely high contrast performance. Note that in the present embodiment, since the reflective layer 28 that covers the outer peripheral surface of each of the light guide members 19A to 19C is provided, the reflective layer 22b described in the first embodiment is omitted.

Other Embodiment

The present invention is not limited to the above embodiments in the above description and drawings. The following embodiments may be included in the technical scope of the present invention, for example.

(1) Although each of the above-described embodiments illustrates an example in which a single light-emitting unit is constituted using three types of light guide members, a single light-emitting unit may be formed using two or four or more types of light guide members. In particular, a configuration in which four or more types of light guide members are used and a single light-emitting unit includes at least four light output portions arranged parallel to each other in the Y-axis direction is preferable because the configuration is easily adaptable to a larger screen.

(2) Each of the above-described embodiments illustrates an example in which the light guide portions and the light output portions, which are optically connected, are arranged to overlap with each other in the front and back direction (Z-axis direction). However, for example, a configuration in which the light guide portions and the light output portions, which are optically connected with each other, are arranged along the arrangement direction (Y-axis direction) of the light output portions without overlapping with each other in the front and back direction can also be included in the present invention.

(3) Although each of the above-described embodiments illustrates an example in which the first light guide portion and the second light guide portion include the first extending-out portion and the second extending-out portion, respectively, one or both of the first extending-out portion and the second extending-out portion may be omitted.

(4) Each of the above-described embodiments illustrates an example in which the LEDs are arranged on the light guide portions in one-to-one correspondence. However, a configuration in which a plurality of LEDs is provided to a single light guide portion can also be included in the present invention. With this configuration, higher brightness can be achieved.

(5) Although each of the above-described embodiments illustrates an example in which the light guide portions adjacent to each other in the X-axis direction are optically connected to the respective light output portions adjacent to each other in the Y-axis direction, the present invention is not limited to this. The light output portions optically connected to the respective light guide portions adjacent to each other in the X-axis direction may be arranged not to be adjacent to each other in the Y-axis direction.

(6) Each of the above-described embodiments illustrates an example in which the light output portions are arranged parallel to each other in the Y-axis direction orthogonal to the X-axis direction which is the arrangement direction of the LEDs. However, a configuration in which the light output portions are arranged parallel to each other with a direction inclined with respect to both the X-axis direction and the Y-axis direction can also be included in the present invention.

(7) The above-described third embodiment illustrates an example in which the reflective layer is formed on the peripheral surface of each light guide portion (excluding the light entrance surface) and on the peripheral surface of each light output portion (excluding the light exit surface). In place of the reflective layer, a reflection sheet may be provided separately from each light guide member.

(8) The above-described first and second embodiments illustrate an example in which each air space is interposed as the low refractive index layer between the adjacent light guide members. However, a configuration in which a low refractive index layer made of a low refractive index material is interposed between the adjacent light guide members can also be included in the present invention.

(9) Although the above-described first and second embodiments illustrate an example in which each air space is interposed between the adjacent light guide members, the adjacent light guide members may be brought into close contact with each other without providing any air space.

(10) Each of the above-described embodiments illustrates an example in which dots made of light scattering particles printed on the light guide members are used as each light scattering portion. Alternatively, for example, a rough surface formed by performing blasting on the light guide members may also be used as the light scattering portion. More alternatively, minute grooves (irregularities) formed during resin molding for the light guide members may also be used as the light scattering portion.

(11) Each of the above-described embodiments illustrates an example in which each light scattering portion is printed on the light guide members in an integrated manner. However, for example, the light scattering portion may be printed on a film as a component separate from each light guide member and the film may be attached to each light guide member.

(12) Although each of the above-described embodiments illustrates an example in which each light guide portion is formed in a prism shape, the specific shape may be changed. For example, each light guide portion may also be formed in a cylindrical shape or an elliptic cylindrical shape.

(13) Although each of the above-described embodiments illustrates an example in which each light output portion has a square shape in a plan view, the specific shape may be changed. For example, each light output portion may also be formed in a rectangular shape whose longitudinal and lateral lengths are different in a plan view, a triangular shape, a circular shape, and an elliptical shape.

(14) Although each of the above-described embodiments illustrates an example in which the light guide portions and the light output portions are integrally formed, the light guide portions and the light output portions may be provided as separate components. In this case, an optical fiber or the like may be used as each light guide portion. Further, the light guide portions and the light output portions, which are provided as separate components, may be fixed to be integrated together with an adhesive.

(15) Although each of the above-described embodiments illustrates an example in which LEDs (LED boards) are arranged at both ends on the long side of the backlight unit, the LEDs may be arranged at both ends on the short side of the backlight unit. In addition, a configuration in which LEDs are arranged only one end of the backlight unit and a configuration in which LEDs are arranged at all three or four ends may also be included in the present invention.

(16) Although each of the above-described embodiments illustrates an example in which the LEDs incorporating LED chips that emit blue light singly are used, LEDs incorporating LED chips that emit violet light singly may also be used. In addition, LEDs incorporating three types of LED chips which respectively emit R, G, and B light beams may also be used.

(17) Although each of the above-described embodiments illustrates the case in which the LEDs mounted on the LED boards are used, LEDs arranged on film-like boards may also be used.

(18) Although each of the above-described embodiments illustrates the case in which the LEDs as the light sources are used, other types of light sources, such as a cold cathode tube or an organic EL, may also be used.

(19) Although each of the above-described embodiments illustrates the case in which the reflection sheet formed across all the light guide members is used, the reflection sheet may be individually formed for each light guide member. As for the optical members, one of the diffuser plate and the optical sheet may be omitted.

(20) Although above-described embodiment illustrates the configuration in which the liquid crystal panel is arranged in a longitudinally placed state assuming that the short-side direction thereof aligned with the vertical direction, the present invention also includes a configuration in which the liquid crystal panel is arranged in a longitudinally placed state assuming that the long-side direction thereof aligned with the vertical direction.

(21) In the above-described embodiment illustrates the case in which the TFTs are used as the switching components of the liquid crystal display device, the present invention is also applicable to a liquid crystal display device using switching components other than TFTs (for example, a thin-film diode (TFD)), and is also applicable to a liquid crystal display device performing monochrome display, in addition to the liquid crystal display device performing color display.

(22) Although the above-described embodiment illustrates the liquid crystal display device using a liquid crystal panel as a display panel, the present invention is also applicable to a display device using other types of display panel.

(23) Although the above-described embodiment illustrates the television receiver including a tuner, the present invention is also applicable to a display device including no tuner.

EXPLANATION OF SYMBOLS

10: Liquid crystal display device (Display device)
11: Liquid crystal panel (Display panel)
12: Backlight unit (Lighting device)
17: LED (Light source)
18: LED board
20: Reflection sheet (Reflection member)
22: Light guide portion
22b: Reflective layer
22A: First light guide portion
22B: Second light guide portion
23: Light output portion
23a: Light exit surface
23A: First light output portion
23B: Second light output portion
24: Light scattering portion
25: First extending-out portion (Extend-out portion)
AR: Air space (Low refractive index layer)
TV: Television receiver
U: Light-emitting unit

The invention claimed is:

1. A lighting device comprising:
a plurality of light sources arranged in a line; and
a light guide member including:
a first light guide member including a first light output portion and a first light guide portion having an elongated shape longer than the first light output portion and a light entrance surface at an end thereof; and
a second light guide member including a second light output portion and a second light guide portion having an elongated shape longer than the second light output portion and a light entrance surface; wherein:
the first light guide member and the second light guide member are arranged with the light entrance surfaces thereof opposite the plurality of light sources;
the first light guide portion and the second light guide portion are connected to each other at long edges thereof;

the first light output portion and the second light output portion are arranged in a line along a longitudinal direction of the first light guide portion and the second light guide portion such that the first light output portion is closer to the plurality of light sources than the second light output portion;

the first light guide member is configured such that light from at least one of the plurality of light sources enters through the light entrance surface thereof, travels through the first light guide portion, and exits from the first light output portion;

the second light guide member is configured such that light from at least one of the plurality of light sources enters through the light entrance surface thereof, travels through the second light guide portion, and exits from the second light output portion; and the first light output portion is overlapped with the first light guide portion at a light exit side, and the second light output portion is overlapped with the second light guide portion at a light exit side.

2. The lighting device according to claim 1, wherein the first light output portion is arranged to overlap with the second light guide portion on the light exit side of the first light output portion.

3. The lighting device according to claim 2, wherein:

the first light output portion and the second light output portion is arranged along a direction orthogonal to an arrangement direction of the plurality of light sources and each of the first light output portion and the second light output portion has substantially an equal dimension in the arrangement direction of the plurality of light sources; and a dimension of each of the first light output portion and the second light output portion in the arrangement direction of the plurality of light sources is substantially equal to a dimension obtained by adding dimensions of the first light guide portion and the second light guide portion in the arrangement direction.

4. The lighting device according to claim 1, wherein at least the first light guide portion includes an extending portion that extends away from the light sources with respect to the first light output portion.

5. The lighting device according to claim 4, wherein the second light output portion is arranged to overlap with the extending portion on the light exit side of the second light output portion.

6. The lighting device according to claim 1, wherein:

each of the first light output portion and the second light output portion includes a light exit surface thorough which light exits from the light exit sides; and each of the first light output portion and the second light output portion includes a light scattering portion on the light exit surface, the light scattering portions are configured to scatter light.

7. The lighting device according to claim 6, wherein:

a dimension of each of the first light output portion and the second light output portion in the arrangement direction of the plurality of light sources is greater than that of each of the first light guide portion and the second light guide portion; and a light scattering degree of the light scattering portions is greater in a portion of the light output portions not overlapping with the first light guide portion and the second light guide portion than in portions of the first light output portion and the second light output portion overlapping with the first light guide portion and the second light guide portion.

8. The lighting device according to claim 7, wherein the light scattering portions have a light scattering degree that increases in a direction extending away from the first light guide portion and the second light guide portion.

9. The lighting device according to claim 1, wherein the light guide portion includes a reflective layer on an end surface that is opposite to an end surface facing the light sources and the reflective layer reflects light.

10. The lighting device according to claim 1, wherein the first light guide portion and the first light output portion are integrally formed, and the second light guide portion and the second light output portion are integrally formed.

11. The lighting device according to claim 1, wherein the first light guide portion and the second light guide portion are adjacent to each other in the arrangement direction of the plurality of light sources and are optically connected to the light output portions adjacent to each other in a direction crossing the arrangement direction of the plurality of light sources.

12. The lighting device according to claim 1, wherein:

a light emitting unit is configured by:

the first light output portion and the second light output portion arranged in a direction crossing an arrangement direction of the plurality of light sources;

and the plurality of light sources supplying light to the first light guide portion and the second light guide portion, and wherein:

a plurality of light emitting units is arranged parallel to each other in the arrangement direction of the plurality of light sources.

13. The lighting device according to claim 1, wherein:

a light emitting unit is configured by:

the first light output portion and the second light output portion arranged in a direction crossing an arrangement direction of the light sources;

and the plurality of light sources supplying light to the first light guide portion and the second light guide portion, and wherein:

at least a pair of the light emitting units is arranged such that a surface of each light emitting unit farthest away from the plurality of light sources faces each other.

14. The lighting device according to claim 1, wherein the plurality of light sources are LEDs.

15. The lighting device according to claim 14, wherein the LEDs are mounted on an LED board extending along an arrangement direction of the first light guide portion and the second light guide portion.

16. The lighting device according to claim 1, further comprising a low refractive index layer provided between the first light guide portion and the second light guide portion and between the first light output portion and the second light output portion, the low refractive index layer having a refractive index lower than that of the first light guide portion and the second light guide portion.

17. The lighting device according to claim 16, wherein the low refractive index layer is an air layer.

18. The lighting device according to claim 1, further comprising a reflection member provided on surfaces of the first light guide portion and the second light guide portion that are opposite to the light exit sides, the reflection member configured to reflect light.

19. The lighting device according to claim 18, wherein the reflection member is provided over the first light guide portion and the second light guide portion.

20. A display device comprising:
a lighting device according to claim 1; and
a display panel that performs display using light from the lighting device.

21. The lighting device according to claim 1, wherein the light entrance surface of the first light guide member is opposite one of the plurality of light sources and the light entrance surface of the second light guide member is opposite to another one of the plurality of light sources.

22. The lighting device according to claim 1, further comprising a chassis having a box shape, wherein the plurality of light sources are arranged in the line on one side wall of the chassis.

* * * * *